(12) United States Patent
Hinohara et al.

(10) Patent No.: US 11,539,764 B2
(45) Date of Patent: Dec. 27, 2022

(54) COMMUNICATION MANAGEMENT SYSTEM, COMMUNICATION SYSTEM, COMMUNICATION MANAGEMENT DEVICE, IMAGE PROCESSING METHOD, AND NON-TRANSITORY COMPUTER-READABLE MEDIUM

(71) Applicants: Hiroshi Hinohara, Kanagawa (JP); Shigeru Nakamura, Kanagawa (JP); Takeshi Homma, Kanagawa (JP); Yuichi Kawasaki, Kanagawa (JP); Masashi Ogasawara, Kanagawa (JP); Atsushi Miyamoto, Kanagawa (JP); Hideki Shiro, Kanagawa (JP); Kenichiro Morita, Tokyo (JP)

(72) Inventors: Hiroshi Hinohara, Kanagawa (JP); Shigeru Nakamura, Kanagawa (JP); Takeshi Homma, Kanagawa (JP); Yuichi Kawasaki, Kanagawa (JP); Masashi Ogasawara, Kanagawa (JP); Atsushi Miyamoto, Kanagawa (JP); Hideki Shiro, Kanagawa (JP); Kenichiro Morita, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/816,260

(22) Filed: Mar. 12, 2020

(65) Prior Publication Data
US 2020/0296146 A1 Sep. 17, 2020

(30) Foreign Application Priority Data

Mar. 13, 2019 (JP) .............................. JP2019-046413
Mar. 5, 2020 (JP) .............................. JP2020-037611

(51) Int. Cl.
*H04L 65/401* (2022.01)
*G06F 3/0354* (2013.01)
(Continued)

(52) U.S. Cl.
CPC ...... *H04L 65/4015* (2013.01); *G06F 3/03545* (2013.01); *G06F 3/0425* (2013.01); *G06F 3/04883* (2013.01); *H04L 65/403* (2013.01)

(58) Field of Classification Search
CPC . H04L 65/4015; H04L 65/403; G06F 3/0425; G06F 3/04883; G06F 3/03545
See application file for complete search history.

(56) References Cited

U.S. PATENT DOCUMENTS

2003/0163525 A1\* 8/2003 Hendriks ................ H04L 67/38
709/204
2007/0124503 A1\* 5/2007 Ramos .................. H04W 4/023
709/248
(Continued)

FOREIGN PATENT DOCUMENTS

CN 109324745 A 2/2019
EP 3068073 A1 9/2016
(Continued)

OTHER PUBLICATIONS

Extended European Search Report dated Jul. 30, 2020, issued in corresponding European Patent Application No. 20162073.9, 12 pages.

*Primary Examiner* — Pei Yong Weng
(74) *Attorney, Agent, or Firm* — Xsensus LLP

(57) ABSTRACT

A communication management system manages a session in which a plurality of terminal apparatuses shares a stroke image. The communication management system includes circuitry configured to: manage stroke information including a plurality of pieces of stroke data representing the stroke image; receive, from a first terminal apparatus, group opera- (Continued)

tion information for designating one or more pieces of stroke data, which are operation targets, from among the plurality of pieces of stroke data; and restrict, based on the group operation information, an operation regarding the one or more pieces of stroke data by a second terminal apparatus, which is different from the first terminal apparatus.

19 Claims, 26 Drawing Sheets

(51) Int. Cl.
   *G06F 3/042* (2006.01)
   *G06F 3/04883* (2022.01)
   *H04L 65/403* (2022.01)

(56) References Cited

U.S. PATENT DOCUMENTS

| | | | | |
|---|---|---|---|---|
| 2010/0199191 A1* | 8/2010 | Takahashi | ............. | G06F 3/0481 |
| | | | | 715/741 |
| 2011/0126127 A1* | 5/2011 | Mariotti | ............. | H04M 7/0027 |
| | | | | 715/753 |
| 2016/0321025 A1* | 11/2016 | Ikeda | .................... | G06F 3/1454 |
| 2018/0027031 A1 | 1/2018 | Kodaira | | |

FOREIGN PATENT DOCUMENTS

| | | |
|---|---|---|
| JP | H04-10994 A | 1/1992 |
| JP | 2015-060592 | 3/2015 |

* cited by examiner

FIG. 8

| TERMINAL ID | DESTINATION NAME | OPERATING STATUS | TIME AND DATE OF RECEPTION | IP ADDRESS OF TERMINAL |
|---|---|---|---|---|
| 01aa | TERMINAL AA, TOKYO OFFICE, JAPAN | ONLINE (COMMUNICATION ENABLED) | 2015.4.10.13.40 | 1.2.1.3 |
| 01ab | MR. AB, TOKYO OFFICE, JAPAN | ONLINE (COMMUNICATION BEING EXECUTED) | 2015.4.09.12.00 | 1.2.1.4 |
| 01ac | MR. AC, TOKYO OFFICE, JAPAN | OFFLINE | 2015.4.09.12.30 | 1.2.1.5 |
| ... | ... | ... | ... | ... |
| 01ba | TERMINAL BA, BEIJING OFFICE, CHINA | ONLINE (COMMUNICATION ENABLED) | 2015.4.10.13.45 | 1.2.2.3 |
| 01bb | MR. BB, BEIJING OFFICE, CHINA | ONLINE (SUSPENDED) | 2015.4.10.13.50 | 1.2.2.4 |
| ... | ... | ... | ... | ... |
| 01ca | TERMINAL CA, WASHINGTON, D.C. OFFICE, USA | OFFLINE | 2015.4.10.12.45 | 1.3.1.3 |
| 01cb | MR. CB, WASHINGTON, D.C. OFFICE, USA | OFFLINE (COMMUNICATION BEING EXECUTED) | 2015.4.10.13.55 | 1.3.1.4 |
| ... | ... | ... | ... | ... |
| 01da | TERMINAL DA, BERLIN OFFICE, EUROPE | ONLINE (COMMUNICATION BEING EXECUTED) | 2015.4.08.12.45 | 1.3.2.3 |
| 01db | MR. DB, BERLIN OFFICE, EUROPE | ONLINE (COMMUNICATION ENABLED) | 2015.4.10.12.45 | 1.3.2.4 |
| ... | ... | ... | ... | ... |

FIG. 9

| SOURCE TERMINAL ID | DESTINATION TERMINAL ID |
|---|---|
| 01aa | 01ab, ..., 01ba, 01bb, ..., 01ca, 01cb, 01da, 01db, ... |
| 01ab | 01aa, 01ca, 01cb, 01da |
| ... | ... |
| 01ba | 01aa, 01ab, 01ca, 01cb, 01da, 01db |
| ... | ... |
| 01da | 01aa, 01ab, 01ba, ..., 01da, 01ca, 01cb, ..., 01db |

| SESSION ID | RELAY DEVICE ID | SOURCE TERMINAL ID | DESTINATION TERMINAL ID | DELAY TIME | TIME AND DATE OF DELAY INFORMATION RECEPTION |
|---|---|---|---|---|---|
| se01 | 111a | 01aa | 01db | 200 | 2015.4.10.13:41 |
| se2 | 111a | 01ba | 01cb | 50 | 2015.4.10.12:01 |
| ... | ... | ... | ... | ... | ... |

| RELAY DEVICE ID | OPERATING STATUS | TIME AND DATE OF RECEPTION | IP ADDRESS OF RELAY DEVICE | MAXIMUM DATA TRANSMISSION RATE |
|---|---|---|---|---|
| 111a | ONLINE | 2015.4.10.12:00 | 1.2.1.2 | 100 |
| 111b | OFFLINE | 2015.4.10.15:10 | 1.2.2.2 | 1000 |
| 111c | ONLINE | 2015.4.10.15:20 | 1.3.1.2 | 100 |
| 111d | ONLINE | 2015.4.10.15:30 | 1.3.2.2 | 10 |

FIG. 19A

```
{
"lock":"abcdefg"
"list":["aaaaaa","bbbbbb","cccccc","dddddd","eeeeee"]
}
```

FIG. 19B

```
{
"lock":"abcdefg"
"list":["bbbbbb","cccccc","dddddd"]
}
```

COMMUNICATION MANAGEMENT SYSTEM, COMMUNICATION SYSTEM, COMMUNICATION MANAGEMENT DEVICE, IMAGE PROCESSING METHOD, AND NON-TRANSITORY COMPUTER-READABLE MEDIUM

CROSS-REFERENCE TO RELATED APPLICATIONS

This patent application is based on and claims priority pursuant to 35 U.S.C. § 119(a) to Japanese Patent Application Nos. 2019-046413, filed on Mar. 13, 2019 and 2020-037611, filed on Mar. 5, 2020, in the Japan Patent Office, the entire disclosures of which are hereby incorporated by reference herein.

BACKGROUND

Technical Field

The present disclosure relates to a communication management system, a communication system, a communication management device, an image processing method, and a non-transitory computer-readable medium.

Description of the Related Art

A conference system to hold a conference between a plurality of terminal apparatuses via a communication network, such as the Internet, has become widespread. In such a conference system, stroke data for reproducing a stroke image drawn by a user with the user's hand, an electronic pen, or the like, using a terminal apparatus such as an electronic whiteboard is exchanged with a terminal apparatus to share the stroke image.

With regard to such a conference system, a technique is known that allows a user at each site to previously know an operation performed by a user at a different site by displaying on a display or the like information regarding the operation performed by the user at the different site.

SUMMARY

According to one or more embodiments, a communication management system manages a session in which a plurality of terminal apparatuses shares a stroke image. The communication management system includes circuitry configured to: manage stroke information including a plurality of pieces of stroke data representing the stroke image; receive, from a first terminal apparatus, group operation information for designating one or more pieces of stroke data, which are operation targets, from among the plurality of pieces of stroke data; and restrict, based on the group operation information, an operation regarding the one or more pieces of stroke data by a second terminal apparatus, which is different from the first terminal apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a table illustrating an example of a terminal management table according to an embodiment of the present disclosure;

FIG. 9 is a table illustrating an example of a destination-list management table according to an embodiment of the present disclosure;

FIG. 10 is a table illustrating an example of a session management table according to an embodiment of the present disclosure;

FIG. 11 is a table illustrating an example of a relay-device management table according to an embodiment of the present disclosure;

FIGS. 19A and 19B are diagrams illustrating examples of group operation information according to an embodiment of the present disclosure;

Figure 1:
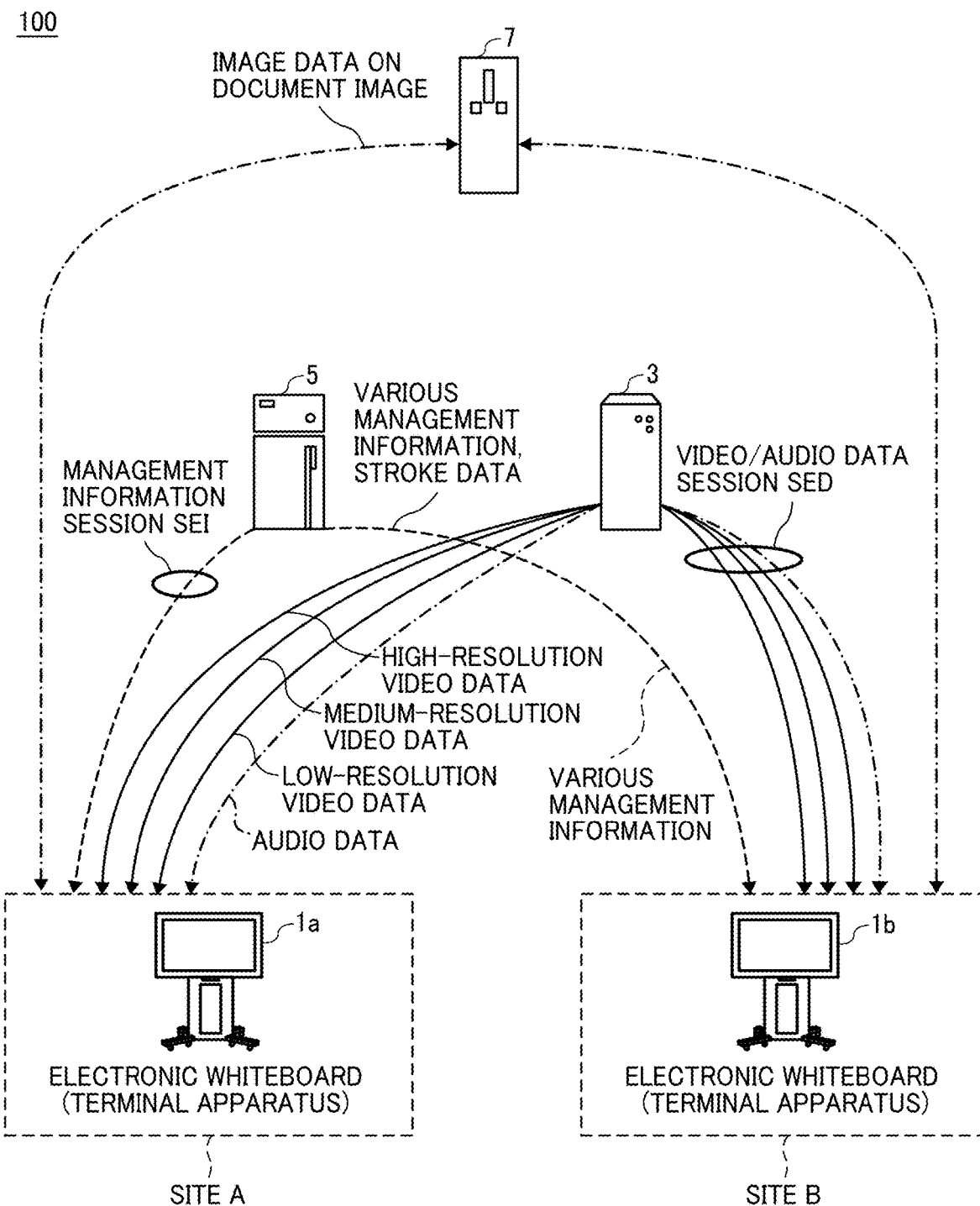
FIG. 1 is a schematic view illustrating an example of a communication route in a communication system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure are described below in detail.

Outline of a Communication System

Communication Route

Referring to FIG. 1, a communication system 100 that is used to hold a video conference between a plurality of electronic whiteboards including an electronic whiteboard 1a and an electronic whiteboard 1b (each being an example of a terminal apparatus) is first described. FIG. 1 is a schematic view illustrating an example of a communication route according to the present embodiment. Hereinafter, "video conference" may be also referred to as "teleconference", "remote conference", etc.

The conference such as "video conference", "teleconference", or "remote conference" is an example of the session in which a plurality of terminal apparatuses shares a stroke image. The session in which a stroke image is shared may include a session such as remote teaching, remote medical examination, discussion, or simple conversation as well as a conference.

The communication system 100 includes, for example, the electronic whiteboard 1a, the electronic whiteboard 1b, a relay device 3, a communication management system 5, and an image storage device 7.

The electronic whiteboard 1a and the electronic whiteboard 1b are terminal apparatuses that perform interactive communications of content data such as video data and audio data for calling and image data and stroke data for sharing. Each of the electronic whiteboard 1a and the electronic whiteboard 1b is also referred to as an interactive whiteboard (IWB).

Although in the example of FIG. 1, the communication system 100 includes the two electronic whiteboards, i.e., the electronic whiteboard 1a and the electronic whiteboard 1b, in another example, the communication system 100 includes three or more electronic whiteboards. In the following description, any one of the electronic whiteboards included in the communication system 100 is referred to as an "electronic whiteboard 1".

The electronic whiteboard 1 is an example of a terminal apparatus according to the present embodiment. The terminal apparatus may be a different terminal apparatus having a communication function, a drawing function, a display function, etc. For example, the terminal apparatus may include an information terminal such as a personal computer (PC), a tablet terminal, or a smartphone, in which the application program corresponding to the communication system 100 is installed.

The stroke data includes the data for reproducing a stroke image. The stroke data includes coordinate data, line width data, line color data, vector data, etc. The electronic whiteboard 1a and the electronic whiteboard 1b exchange video data and audio data for calling with the other end of the communication to reproduce video and sound of the other end so as to enable video communications.

The electronic whiteboard 1a and the electronic whiteboard 1b exchange the image data on a shared document image so that the user of the communication system 100 may share the identical document image. The document image includes an image presented on a display of the electronic whiteboard 1. The document image may include, for example, a document for a conference, a background image displayed on the display, or an image of the capture screen that is obtained when the display screen is captured.

The electronic whiteboard 1a and the electronic whiteboard 1b exchange the stroke data on a shared stroke image so that a participant using the communication system 100 may share the identical stroke image. The stroke image includes the image representing, for example, a handwritten stroke line by a user with an electronic pen, or the like. The stroke image is displayed by using the stroke data representing the points specifying the coordinates on the display.

FIG. 1 illustrates electronic whiteboards having a video conference function as examples of the electronic whiteboard 1a and the electronic whiteboard 1b. The image of the video data can be either a moving image or a still image.

In the following description, the electronic whiteboard 1 that requests the start of a video conference is referred to as a "source terminal", and the electronic whiteboard 1 that is at the destination (relay destination) of the request is referred to as a "destination terminal". In FIG. 1, for example, in a case where the electronic whiteboard 1a requests the start of a video conference with the electronic whiteboard 1b, the electronic whiteboard 1a is a source terminal and the electronic whiteboard 1b is a destination terminal. The electronic whiteboard 1a and the electronic whiteboard 1b can be used not only for the communications between offices or the communications between different rooms in the same office but also for the communications in the same room, the communications between outdoor and indoor areas, or the communications in outdoor areas.

The relay device 3, which is implemented by one or more computers, performs a process of relaying content data for communications between the electronic whiteboard 1a and the electronic whiteboard 1b.

The communication management system 5 is implemented by one or more computers. The communication management system 5 centrally controls, for example, the authentication of login from the electronic whiteboard 1a and the electronic whiteboard 1b, the communication statuses of the electronic whiteboard 1a and the electronic whiteboard 1b, a destination list, or the communication status of the relay device 3. The communication management system 5 relays stroke data to be shared between the electronic whiteboard 1a and the electronic whiteboard 1b.

The image storage device 7, which is implemented by one or more computers, stores the image data on a shared document image, which is uploaded from the electronic whiteboard 1a, and downloads the image data to the electronic whiteboard 1b, and vice versa. That is, the image storage device 7 stores the image data uploaded from the electronic whiteboard 1b and downloads the image data to the electronic whiteboard 1a.

In one example, each of the relay device 3, the communication management system 5, and the image storage device 7 is configured as a single computer. In another example, each of the relay device 3, the communication management system 5, and the image storage device 7 is configured as a plurality of computers to which one or more units (functions, means, or storages) are arbitrarily allocated.

In the communication system 100, a management information session sei (hereinafter referred to as "session sei") for exchanging various types of management information is established between the electronic whiteboard 1a and the electronic whiteboard 1b via the communication management system 5. Four sessions for exchanging four pieces of data, i.e., high-resolution image data, medium-resolution image data, low-resolution image data, and audio data, are established between the electronic whiteboard 1a and the electronic whiteboard 1b via the relay device 3. As illustrated in FIG. 1, the four sessions are collectively referred to as an image/audio data session sed (hereinafter simply referred to as "session"). The image/audio data session sed does not necessarily have to be four sessions and can have a smaller or larger number of sessions than the four sessions. A session may be established directly between the source terminal and the destination terminal without the relay device 3 interposed therebetween.

In the communication system 100, stroke data may be exchanged between the electronic whiteboard 1a and the electronic whiteboard 1b by using the session sei.

The resolution of the video of video data according to the present embodiment is described below. Low-resolution video data includes a base image including, for example, 160 pixels horizontally and 120 pixels vertically. Medium-resolution video data includes, for example, 320 pixels horizontally and 240 pixels vertically. High-resolution video data includes, for example, 640 pixels horizontally and 480 pixels vertically. Low-image quality video data including simple low-resolution video data, which includes a base image, is relayed in the case of a narrowband path. Medium-image quality video data including low-resolution video data, which includes a base image, and medium-resolution video data is relayed in the case of a relatively wide band. High-image quality video data including low-resolution video data, which includes a base image, medium-resolution video data, and high-resolution video data is relayed in the case of a very wide band. Audio data is relayed even in a narrowband path as the audio data has a small amount of data as compared with video data.

Example of Usage of the Electronic Whiteboard

Figure 2:
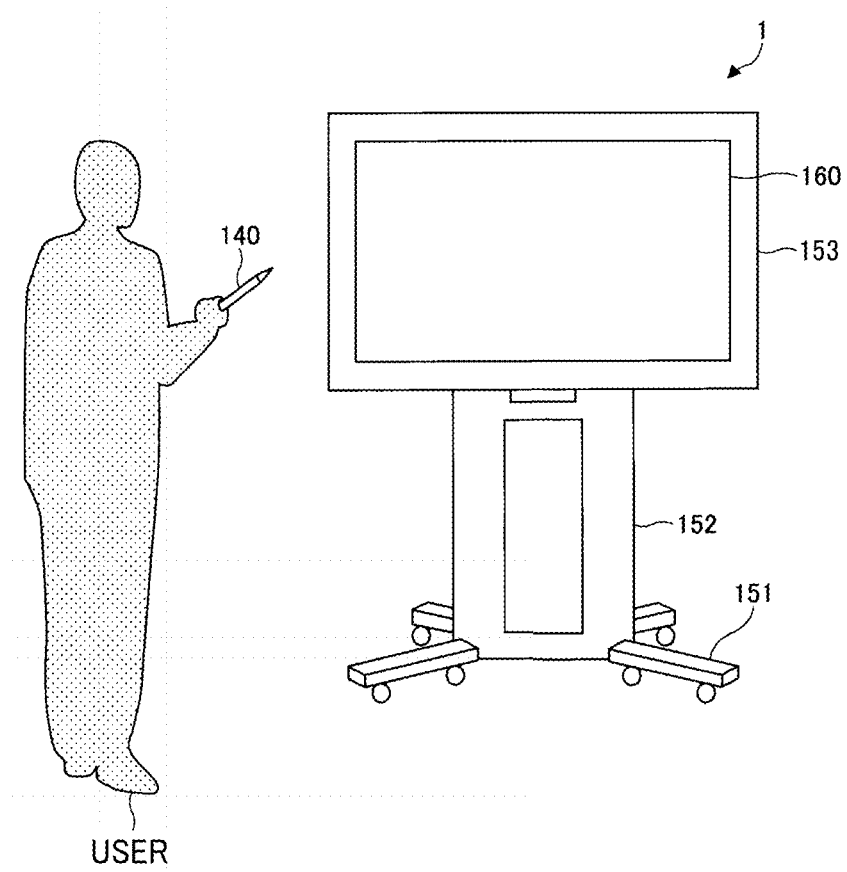
FIG. 2 is a diagram illustrating an example of the usage of an electronic whiteboard according to an embodiment of the present disclosure.

FIG. 2 illustrates an example of how a user uses the electronic whiteboard 1 according to an embodiment of the present disclosure. As illustrated in FIG. 2, the electronic whiteboard 1 includes, for example, a leg 151 including a plurality of casters on the lower side thereof; a support 152 provided on the upper side of the leg 151; a main body 153 provided on the upper side of the support 152; and a display 160 provided on the front side of the main body 153. The main body 153 includes a central processing unit (CPU) 101, and the like, described later. The user may input (draw) a stroke image of a character, or the like, on the display 160 with the electronic pen 140, etc.

Hardware Configuration

Next, an example of the hardware configuration of each device according to the present embodiment is described.

Hardware Configuration of the Electronic Whiteboard

Figure 3:
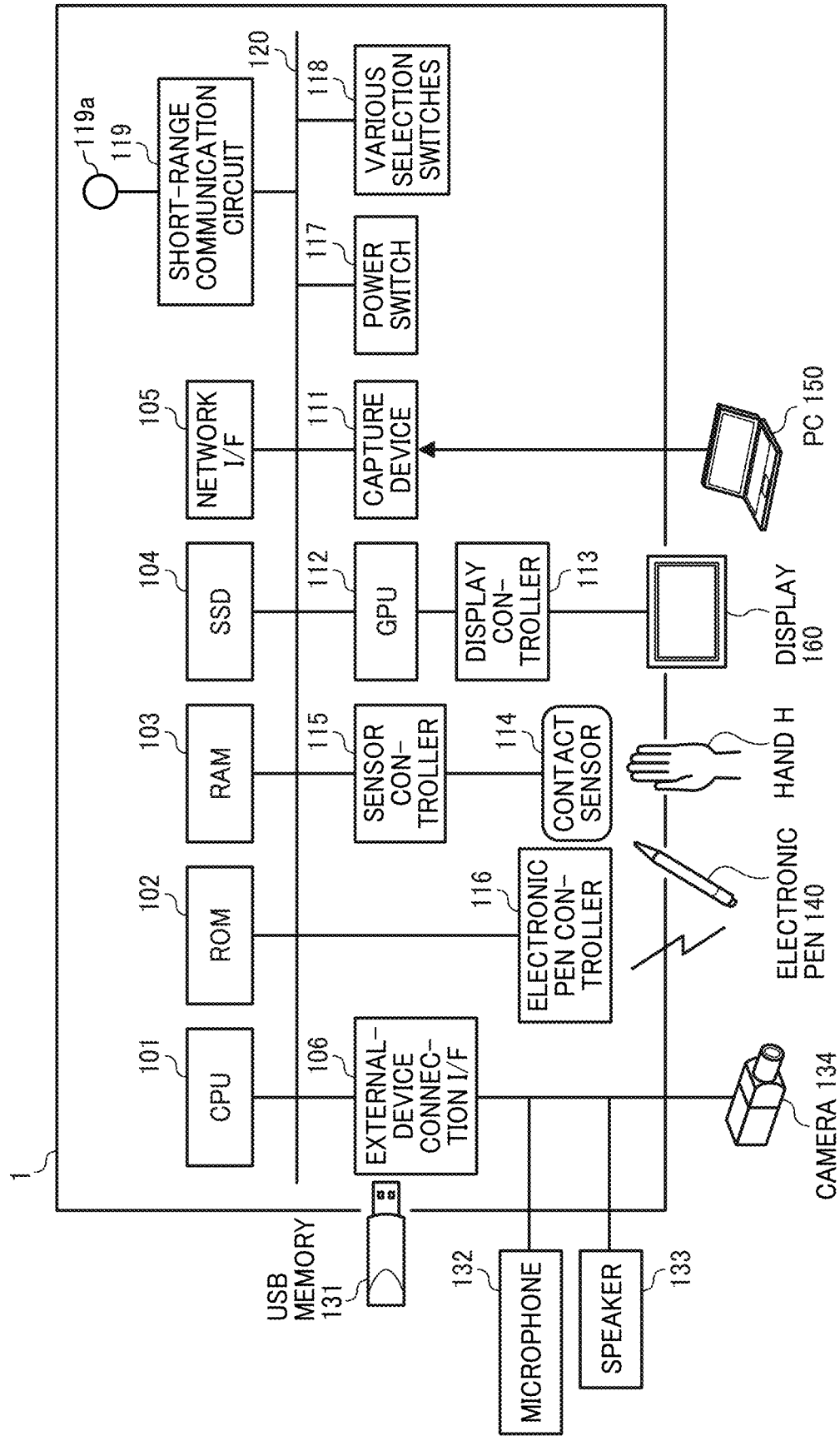
FIG. 3 is a block diagram illustrating an example of the hardware configuration of the electronic whiteboard according to an embodiment of the present disclosure.

FIG. 3 is a block diagram illustrating an example of the hardware configuration of the electronic whiteboard 1 according to an embodiment of the present disclosure. As illustrated in FIG. 3, the electronic whiteboard 1 includes, for example, the CPU 101, a read only memory (ROM) 102, a random access memory (RAM) 103, a solid state drive (SSD) 104, a network interface (I/F) 105, and an external-device connection I/F 106.

The CPU 101 includes an arithmetic device that controls the overall operation of the electronic whiteboard 1. The ROM 102 includes a non-volatile memory that stores a program, such as initial program loader (IPL) to boot the CPU 101. The RAM 103 includes a volatile memory used as a work area for the CPU 101. The SSD 104 includes a large-capacity storage device that stores various types of data such as programs for the electronic whiteboard 1.

The network I/F 105 includes a communication interface to couple the electronic whiteboard 1 to a communication network for communications. The external-device connection I/F 106 includes an interface to couple various external devices. In this case, examples of the external devices include a universal serial bus (USB) memory 131 and externally coupled devices (a microphone 132, a speaker 133, and a camera 134), etc.

The electronic whiteboard 1 further includes, for example, a capture device 111, a graphics processing unit (GPU) 112, a display controller 113, a contact sensor 114, a sensor controller 115, an electronic pen controller 116, a short-range communication circuit 119, an antenna 119a of the short-range communication circuit 119, a power switch 117, and various selection switches 118.

The capture device 111 captures (acquires) the display screen, or the like, presented on the display of an externally coupled PC 150 as a still image or a moving image. The GPU 112 includes a semiconductor chip (processor) dedicated for graphics. The display controller 113 controls and manages the screen display in order to output an image output from the GPU 112 to the display 160, etc. The contact sensor 114 detects the contact on the display 160 with the electronic pen 140, the hand H of the user, etc. The sensor controller 115 controls the processing of the contact sensor 114.

The contact sensor 114 for example inputs and detects coordinates by using an infrared blocking method. More specifically, the display 160 is provided with two light receiving elements disposed on both upper side ends of the display 160, and a reflector frame surrounding the sides of the display 160. The light receiving elements emit a plurality of infrared rays in parallel to a surface of the display 160. The light receiving elements receive lights passing in the direction that is the same as an optical path of the emitted infrared rays, which are reflected by the reflector frame. The contact sensor 114 outputs the IDs of the infrared rays emitted by the two light emitting and receiving devices and blocked by the object to the sensor controller 115. The sensor controller 115 identifies the coordinates position that is the contact position of the object. The electronic pen controller 116 communicates with the electronic pen 140 to determine whether there is a touch on the display 160 with the pen tip or the opposite end from the pen tip. The short-range communication circuit 119 includes a communication circuit for a near field communication (NFC), Bluetooth (registered trademark), etc.

The power switch 117 includes a switch for turning on/off the power of the electronic whiteboard 1. The various selection switches 118 include, for example, a group of switches that adjust the brightness, the color, and the like, of the display 160.

The electronic whiteboard 1 further includes a bus line 120. The bus line 120 includes, for example, an address bus, a data bus, and various control signals to electrically connect each component such as the CPU 101 illustrated in FIG. 3.

For example, the contact sensor 114 may use, instead of the infrared blocking method, a capacitive touch panel that detects a change in the capacitance to identify the contact position or a resistive film touch panel that identifies the contact position in accordance with a change in the voltage of two opposing resistive films. In another example, the contact sensor 114 may use an electromagnetic induction touch panel that identifies a contact position by detecting electromagnetic induction caused by contact of an object to a display. The electronic pen controller 116 may determine whether there is a touch with the portion of the electronic pen 140 grasped by the user or other portions of the electronic pen 140 as well as the pen tip of the electronic pen 140 and the opposite end from the pen tip.

Hardware Configuration of the Communication Management System, the Relay Device, the Image Storage Device, the PC, Etc.

Figure 4:
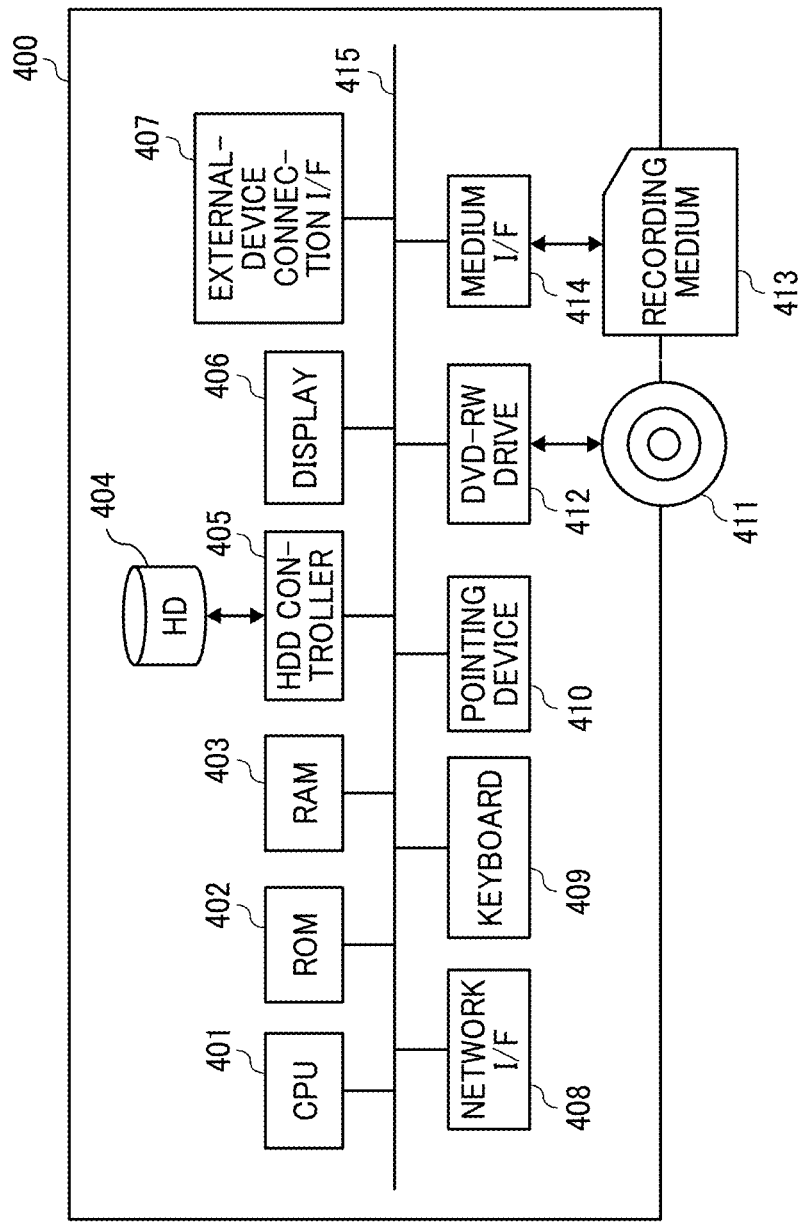
FIG. 4 is a block diagram illustrating an example of the hardware configuration of a computer according to an embodiment of the present disclosure.

The communication management system 5, the relay device 3, the image storage device 7, the PC 150, etc. include the hardware configuration of a computer 400 illustrated in FIG. 4. The communication management system 5, the relay device 3, and the image storage device 7 may be implemented by using the multiple computers 400.

FIG. 4 is a block diagram illustrating an example of the hardware configuration of the computer 400 according to an embodiment of the present disclosure. The computer 400 includes, for example, a CPU 401, a ROM 402, a RAM 403, a hard disk (HD) 404, a hard disk drive (HDD) controller 405, a display 406, an external-device connection I/F 407, a network I/F 408, a keyboard 409, a pointing device 410, a digital versatile disk rewritable (DVD-RW) drive 412, a medium I/F 414, and a bus line 415.

The CPU 401 includes an arithmetic device that controls the overall operation of the computer 400. The ROM 402 includes a non-volatile memory that stores a program, such as IPL to boot the CPU 401. The RAM 403 includes a volatile memory used as a work area for the CPU 401. The HD 404 includes a large-capacity storage device that stores programs for the operating system (OS), applications, and the like, and various types of data. The HDD controller 405 controls the reading or writing of various types of data from or to the HD 404 under the control of the CPU 401.

The display 406 presents various types of information such as a cursor, a menu, a window, characters, or images. The external-device connection I/F 407 includes an interface that couples various external devices. The network I/F 408 includes a communication interface that executes data communications using a communication network. The keyboard 409 is an example of an input device (input means) provided with a plurality of keys to input characters, numerical values, various instructions, etc. The pointing device 410 includes one type of input unit that, for example, selects or executes various instructions, selects the target to be processed, or moves the cursor.

The DVD-RW drive 412 controls the reading or writing (storing) of data from or to a DVD-RW 411. The DVD-RW drive 412 may control the reading or writing (storing) of data from or to a disk such as Blu-ray (registered trademark) disc rewritable (BD-RE) instead of the DVD-RW 411. The medium I/F 414 controls the reading or writing (storing) of data from or to a recording medium 413 such as a flash memory. The bus line 415 includes, for example, an address bus, a data bus, and various control signals to electrically connect each component such as the CPU 401 illustrated in FIG. 4.

General Arrangement of the Communication System

Figure 5:
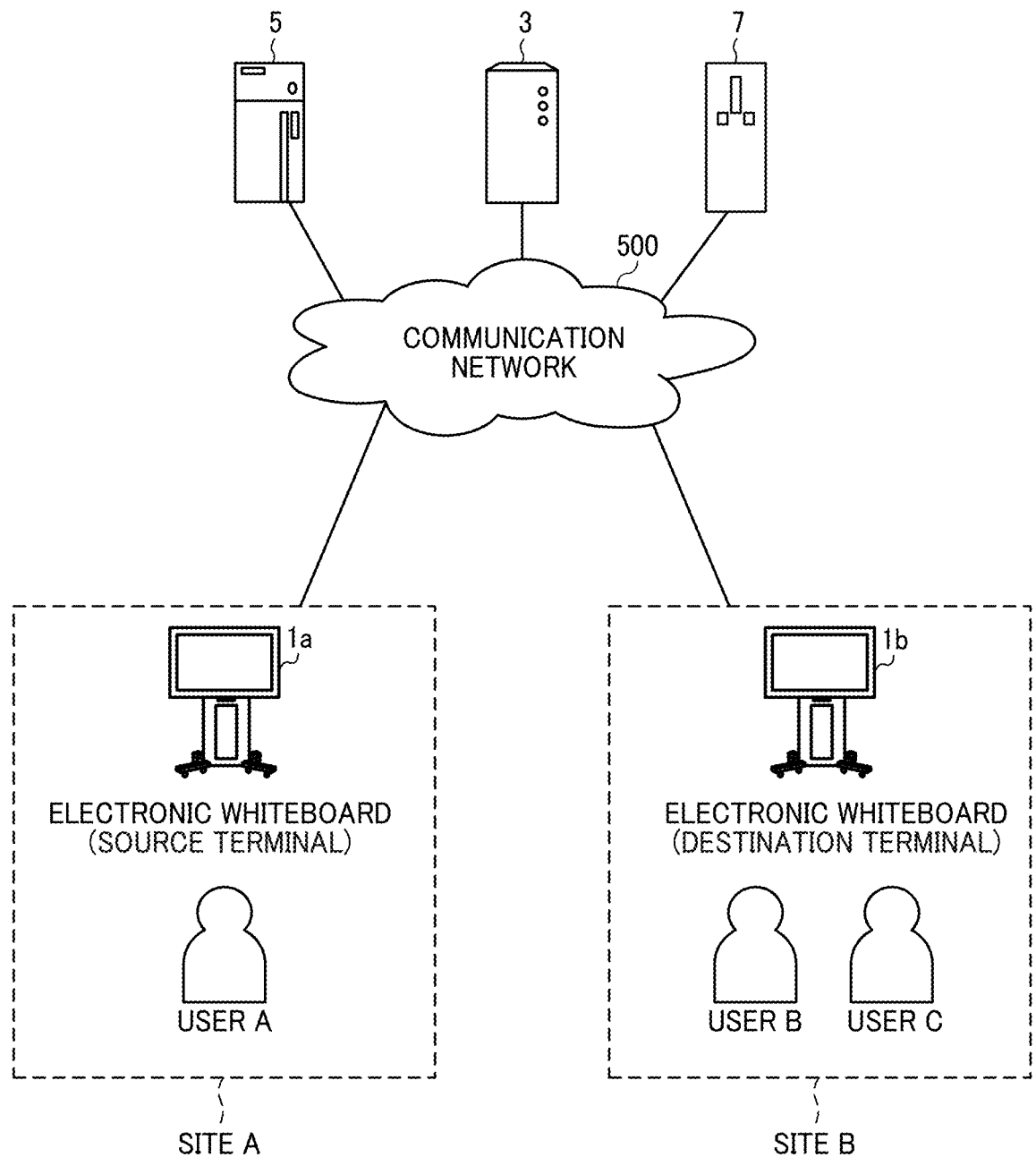
FIG. 5 is a diagram illustrating an example of the configuration of the communication system according to an embodiment of the present disclosure.

Next, an example of the general arrangement of the communication system 100 is described. FIG. 5 is a diagram illustrating an example of the configuration of the communication system 100 according to an embodiment of the present disclosure.

As illustrated in FIG. 5, the electronic whiteboard 1*a* is provided at a site A and the electronic whiteboard 1*b* is provided at a site B. For example, the site A is a Tokyo office in Japan, and the site B is an Osaka office in Japan. A user A uses the electronic whiteboard 1*a* at the site A, and a user B and a user C use the electronic whiteboard 1*b* at the site B. The electronic whiteboard 1*a* is an example of a first terminal apparatus. The electronic whiteboard 1*b* is an example of a second terminal apparatus.

The electronic whiteboard 1*a*, the electronic whiteboard 1*b*, the relay device 3, the communication management system 5, and the image storage device 7 can exchange data with each other via a communication network 500 such as the Internet or a local area network (LAN). The communication network 500 may include a wireless communication part. In FIG. 5, the electronic whiteboard 1*a* and the electronic whiteboard 1*b* include electronic whiteboards capable of transmitting and receiving conference videos.

Functional Configuration of the Communication System

Figure 6:
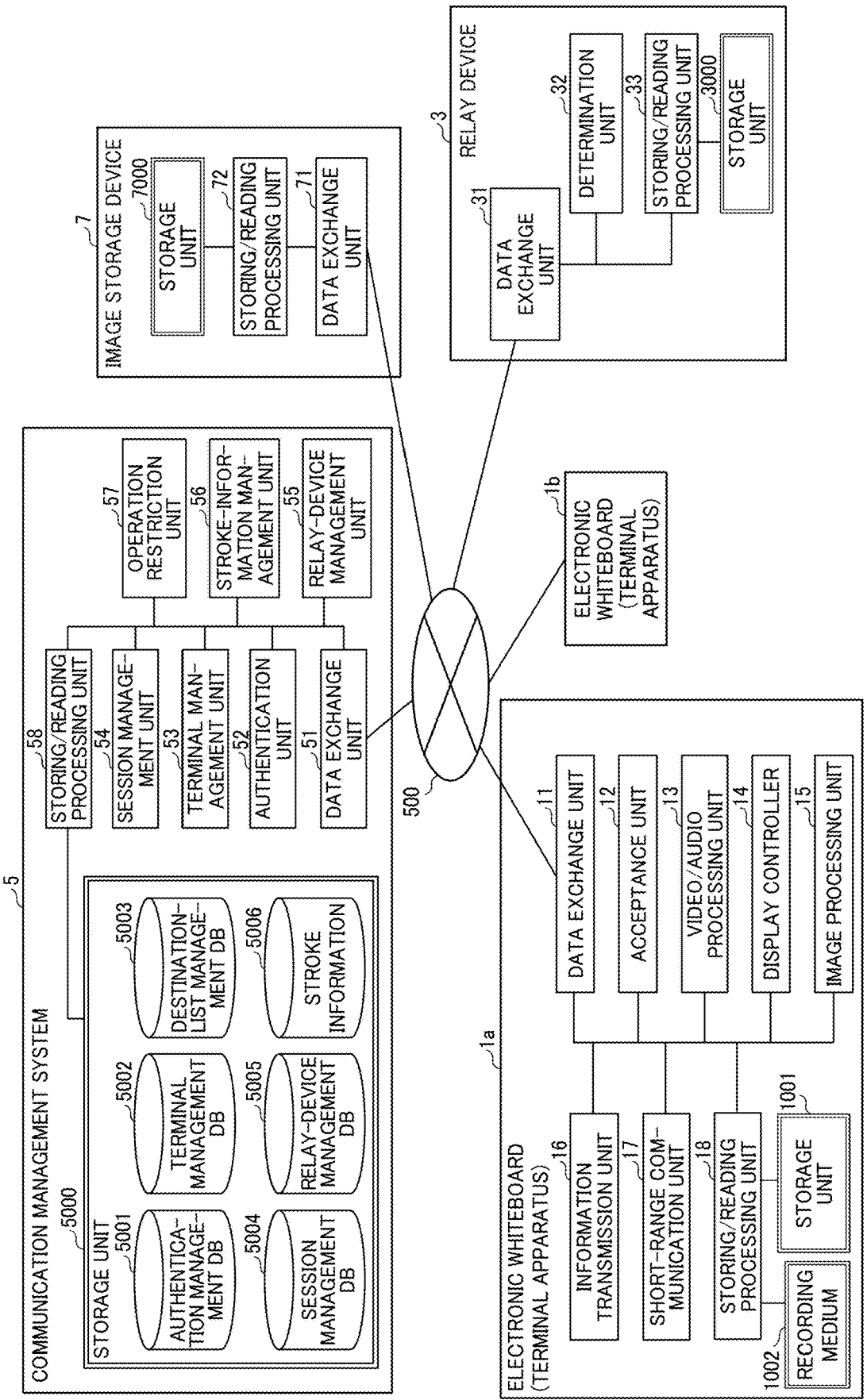
FIG. 6 is a block diagram illustrating an example of the functional configuration of the communication system according to an embodiment of the present disclosure.

Next, an example of the functional configuration of the communication system 100 according to the present embodiment is described. FIG. 6 is a block diagram illustrating an example of the functional configuration of the communication system 100 according to an embodiment of the present disclosure. In FIG. 6, the electronic whiteboard 1*b* includes the same functional configuration as that of the electronic whiteboard 1*a*.

Functional Configuration of the Electronic Whiteboard

Each of a data exchange unit 11, an acceptance unit 12, a video/audio processing unit 13, a display controller 14, an image processing unit 15, an information transmission unit 16, a short-range communication unit 17, and a storing/reading processing unit 18 of each electronic whiteboard 1 is implemented by the CPU 101 illustrated in FIG. 3 executing a predetermined program. At least a part of the above-described functional configurations may be implemented by using hardware. Each electronic whiteboard 1 further includes a storage unit 1001 implemented by the RAM 103, the SSD 104, and the like, illustrated in FIG. 3.

Each Functional Configuration of the Electronic Whiteboard 1

The data exchange unit 11 exchanges various types of data (or information) with a different terminal, device, or system via the communication network 500. The data exchange unit 11 also serves as a starting unit that performs processing for login to the communication management system 5, or the like, and performs processing to start the communication with a different terminal apparatus.

The acceptance unit 12 accepts various inputs from the user with the electronic pen 140, etc. For example, the acceptance unit 12 accepts the designation operation to designate one or more pieces of stroke data that is the operation target, the change operation regarding stroke data, or the operation to draw a stroke image.

The video/audio processing unit 13 performs the primary processing of the video conference function. For example, the video/audio processing unit 13 performs digital processing such as encoding on video data and audio data based on a signal output from the microphone 132 and a signal output from the camera 134. The video/audio processing unit 13, for example, generates a video signal or an audio signal based on the video data and the audio data received by the data exchange unit 11. Furthermore, the video/audio processing unit 13 also performs, for example, the process to combine pieces of video data having different resolutions.

The display controller 14 performs the control to output a video signal (image signal), or the like, to the display 160 and display the display screen.

The image processing unit 15 performs the primary processing of the electronic whiteboard function. For example, the image processing unit 15 performs, for example, the process to generate a stroke image or stroke data based on the stroke of the electronic pen 140, or the like, received by the acceptance unit 12 or the process to generate a stroke image based on the stroke data received by the data exchange unit 11. The image processing unit 15 also performs the process to generate an image signal based on the image data on the document image received by the data exchange unit 11.

The information transmission unit 16 transmits the stroke data generated by the image processing unit 15 to the communication management system 5. In response to the designation operation for designating one or more pieces of stroke data, which is the operation target, accepted by the acceptance unit 12, the information transmission unit 16 transmits the group operation information for designating one or more pieces of stroke data to the communication management system 5.

The short-range communication unit 17 acquires or provides data from or to each terminal including a short-range communication unit via a short-range wireless communication.

The storing/reading processing unit 18 performs, for example, the process to store various types of data in the storage unit 1001 or a recording medium 1002 such as the USB memory 131 and the process to read various types of data stored in the storage unit 1001 or the recording medium 1002.

The storage unit 1001 overwrites video data and audio data each time the video data and the audio data are received during the communication with a different terminal. The display 160 presents the image based on the video data before overwriting, and the speaker 133 outputs the sound based on the audio data before overwriting.

Functional Configuration of the Communication Management System

The communication management system (an example of a communication management device) 5 uses for example the CPU 401 illustrated in FIG. 4 to execute a predetermined program so as to implement a data exchange unit 51, an authentication unit 52, a terminal management unit 53, a session management unit 54, a relay-device management unit 55, a stroke-information management unit 56, an operation restriction unit 57, a storing/reading processing unit 58, etc. Each of the above-described functional configurations may be implemented by using a program executed by the multiple computers 400. At least a part of the above-described functional configurations may be implemented by using hardware. The communication management system 5 includes a storage unit 5000 that is implemented by using for example the HD 504 illustrated in FIG. 4. The storage unit 5000 includes, for example, an authentication management database (DB) 5001, a terminal management DB 5002, a destination-list management DB 5003, a session management DB 5004, a relay-device management DB 5005, and stroke information 5006.

Authentication Management Table

Figure 7:
FIG. 7 is a table illustrating an example of an authentication management table according to an embodiment of the present disclosure.

FIG. 7 is a table illustrating an example of an authentication management table 700 according to an embodiment of the present disclosure. The storage unit 5000 stores, for example, the authentication management DB 5001 including the authentication management table 700 illustrated in FIG. 7. In the authentication management table 700, for management, a password is related to the terminal ID of each electronic whiteboard 1 managed by the communication management system 5. For example, in the authentication management table 700 illustrated in FIG. 7, the password "aaaa" is related to the terminal ID "01aa" of the electronic whiteboard (terminal apparatus) 1*a*.

The terminal ID is the identification information for identifying the electronic whiteboard (terminal apparatus) 1. The terminal ID is an example of the identification information for the communication management system 5 to manage a terminal apparatus such as the electronic whiteboard 1. Instead of the terminal ID, the communication management system 5 may manage the electronic whiteboard 1 by using, for example, a user ID for identifying a user, a contract ID for identifying a contractor, or a communication ID for identifying a communication source.

The password is an example of the authentication information for authenticating a terminal apparatus such as the electronic whiteboard 1. The authentication information may be authentication information, such as an access token, other than the password.

Terminal Management Table

FIG. 8 is a table illustrating an example of a terminal management table 800 according to an embodiment of the present disclosure. For example, the storage unit 5000 stores a terminal management DB 5002 including the terminal management table 800 illustrated in FIG. 8. The terminal management table 800 stores, for each one of the terminal IDs identifying the electronic whiteboards 1 (terminal apparatuses), a terminal name to be used when each electronic whiteboard 1 is a destination terminal, an operating status of each electronic whiteboard 1, reception date and time when login request described below is received by the communication management system 5, and the internet protocol (IP) address of each electronic whiteboard 1 (terminal apparatus) in association with each other.

For example, in the terminal management table 800 illustrated in FIG. 8, the electronic whiteboard 1*a* with the terminal ID "01aa" has "terminal AA, Tokyo office, Japan" as the terminal name and "online (communication enabled)" as the operating status. The electronic whiteboard 1*a* with the terminal ID "01aa" has "2015.4.10.13:40" as the time and date of reception of login request information received by the communication management system 5 and "1.2.1.3" as the internet protocol (IP) address. The terminal ID, the destination name, the IP address of the terminal, and the like, are stored when each electronic whiteboard 1 is previously registered to receive a service provided by the communication management system 5.

Destination-List Management Table

FIG. 9 is a table illustrating an example of a destination-list management table 900 according to an embodiment of the present disclosure. The storage unit 5000 stores, for example, the destination-list management DB 5003 including the destination-list management table 900 illustrated in FIG. 9. In the destination-list management table 900, for management, the terminal ID of the electronic whiteboard (source terminal) 1 requesting the start of a communication is related to all the terminal IDs of destination terminals that are registered as candidates for the electronic whiteboard (destination terminal) 1. For example, in the destination-list management table 900 illustrated in FIG. 9, the candidates for the destination terminal with which the source terminal (the electronic whiteboard 1a) with the terminal ID "01aa" may request the start of a communication include the electronic whiteboard 1b with the terminal ID "01ba". The candidates for the destination terminal are updated by addition or deletion in accordance with an addition or deletion request from any source terminal to the communication management system 5.

The destination list is an example of destination information. The destination information may have a row of information, such as terminal IDs, regarding the destination rather than in list form.

Session Management Table

FIG. 10 is a table illustrating an example of a session management table 1000 according to an embodiment of the present disclosure. The storage unit 5000 stores, for example, the session management DB 5004 including the session management table 1000 illustrated in FIG. 10. In the session management table 1000, for management, the session ID for identifying each session is related to, for example, the device ID of the relay device 3 used, the terminal ID of the source terminal, the terminal ID of the destination terminal, and the terminal IDs of one or more participant terminals. In the session management table 1000, for management, the session ID is further related to information such as the reception delay time (ms) of video data received at the destination terminal and the time and date of reception of the delay information indicating the delay time received from the destination terminal. For example, in the session management table 1000 illustrated in FIG. 10, for the session with the session ID "se01", the relay device 3 with the relay device ID "111a" relays the communication between the source terminal with the terminal ID "01aa" and the destination terminal with the terminal ID "01ba". Furthermore, in the session with the session ID "se01", the delay time of the video data at"2015.4.10.13:41" is 200 (ms).

Relay-Device Management Table

FIG. 11 is a table illustrating an example of a relay-device management table 1100 according to an embodiment of the present disclosure. The storage unit 5000 stores, for example, the relay-device management DB 5005 including the relay-device management table 1100 illustrated in FIG. 11. In the relay-device management table 1100, for management, the relay device ID of each of the relay devices 3 is related to, for example, the operating status of the corresponding relay devices 3, the time and date of reception of the status information indicating the operating status, the IP address of the relay device 3, and the maximum data transmission rate (Mbps). For example, in the relay-device management table 1100 illustrated in FIG. 11, the relay device 3 with the relay device ID "111a" has "online" as the operating status and "2015.4.10.12:00" as the time and date of reception of the status information received by the communication management system 5. Furthermore, the relay device 3 with the relay device ID "111a" has "1.2.1.2" as the IP address of the relay device 3 and 100 Mbps as the maximum data transmission rate of the relay device 3.

Stroke Information

Figure 12:
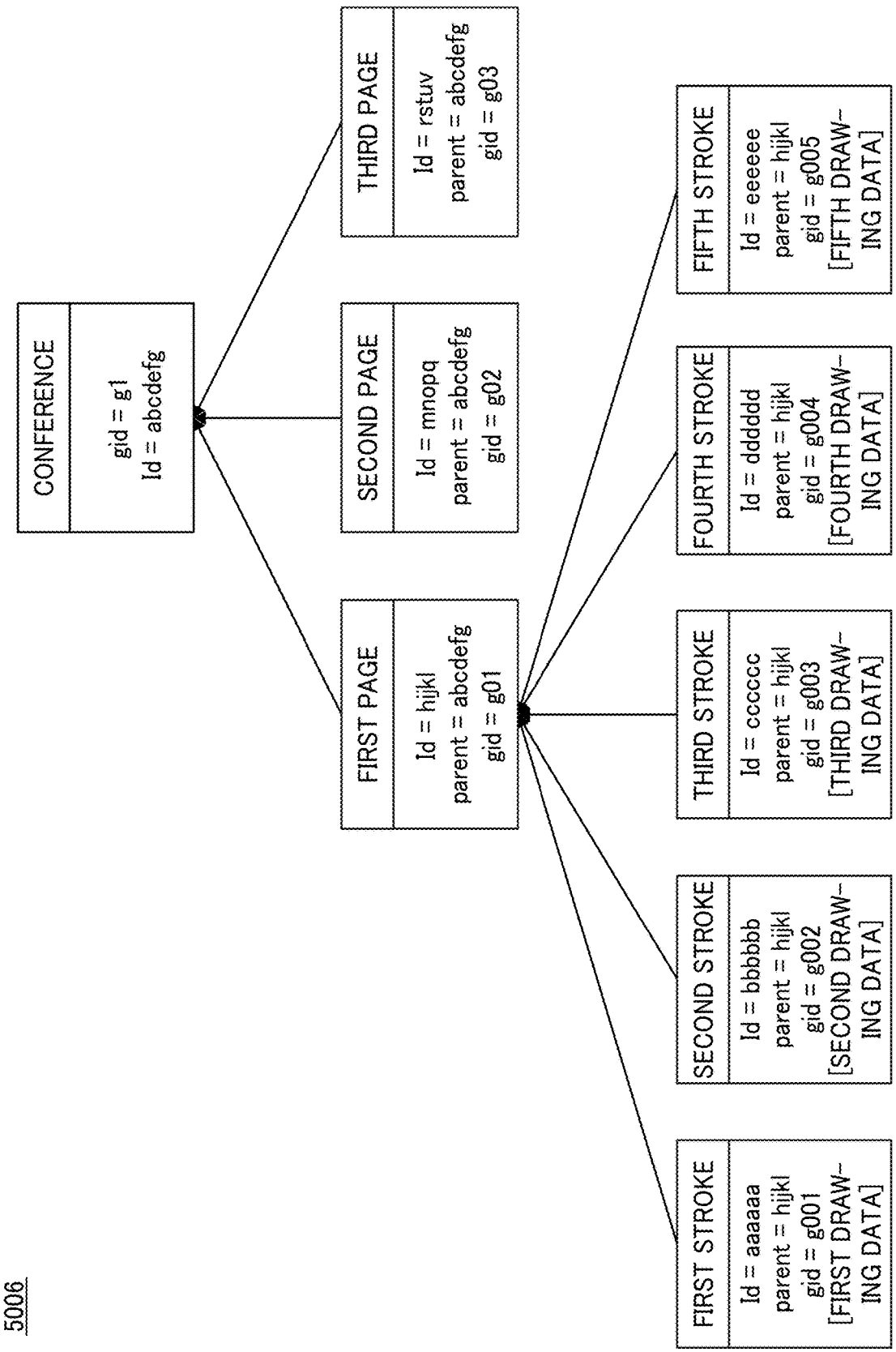
FIG. 12 is a diagram illustrating stroke information according to an embodiment of the present disclosure.

FIG. 12 is a diagram illustrating the stroke information according to an embodiment of the present disclosure. FIG. 12 illustrates an example of stroke information 5006 stored in the storage unit 5000.

In the example of FIG. 12, the stroke information 5006 has a hierarchical structure of "conference", "pages (a first page to a third page)", and "strokes (a first stroke to a fifth stroke)".

The "stroke" corresponds to the stroke data according to the present embodiment and is managed for each "page" by the stroke-information management unit 56. For example, the first stroke includes the stroke ID (id=aaaaaa) for identifying the first stroke, the information (parent=hijkl) for identifying the first page, which is a parent, Gid "g001" for identifying first drawing data, and the first drawing data. For example, when an operation for movement is performed on the stroke image represented by the first stroke, the first drawing data and the Gid "g001" for identifying the first drawing data are updated although the stroke ID (id=aaaaaa) is continuously used.

The first drawing data includes the drawing data for reproducing the first stroke. The first drawing data includes, for example, coordinate data, line width data, line color data, or vector data.

The electronic whiteboard 1 enables page switching, and "page" corresponds to each page of the electronic whiteboard 1. For example, the first page includes information such as the page ID (id=hijkl) for identifying the first page or the information (parent=abcdefg) for identifying the parent "conference".

The "conference" corresponds to the session managed by the communication system 100 and is managed by using, for example, the session ID (id=abcdefg) for identifying the session.

For example, the image processing unit 15 of the electronic whiteboard 1 may use the first drawing data to fifth drawing data included in the first stroke to the fifth stroke to generate the stroke image drawn on the first page.

The session ID (id=abcdefg) is an example of first identification information for identifying a session (conference). The stroke ID (id=aaaaaa) is an example of second identification information for identifying stroke data. Further, the Gid "g001", or the like for identifying the first drawing data is an example of third identification information for identifying drawing data.

Each Functional Configuration of the Communication Management System Referring back to FIG. 6, each functional configuration of the communication management system 5 is described below.

The data exchange unit 51 exchanges various types of data (or information) with a different terminal, device, or system via the communication network 500. For example, the data exchange unit 51 functions as a reception unit that receives, from the electronic whiteboard 1, the group operation information for designating one or more pieces of stroke data that is the operation target. The data exchange unit 51 is an example of the reception unit.

The authentication unit 52 conducts authentication of the login request received via the data exchange unit 51. For example, the authentication unit 52 permits the login of the electronic whiteboard 1 when the authentication management table 700 illustrated in FIG. 7 stores the combination of the terminal ID and the password included in the login request received from the electronic whiteboard 1.

The terminal management unit 53 manages the terminal management DB 5002. For example, the terminal management unit 53 updates the information such as the operating status, the reception time and date, and the terminal IP address in the terminal management table 800 illustrated in FIG. 8 in accordance with the status of the electronic whiteboard 1.

The terminal management unit 53 manages the destination-list management table 900. For example, the terminal management unit 53 provides the destination-list information including the terminal ID of the destination terminal in the destination-list management table 900 illustrated in FIG. 9 in response to a request from the electronic whiteboard 1.

The session management unit 54 manages the session held by the communication system 100. For example, the session management unit 54 generates the session ID for identifying the session based on the start request information requesting the start of a communication from the electronic whiteboard 1. The session management unit 54 stores and manages various types of information regarding a session in relation to the session ID in, for example, the session management table 1000 illustrated in FIG. 10.

The relay-device management unit 55 manages the relay-device management DB 5005. The relay-device management unit 55 uses, for example, the relay-device management table 1100 illustrated in FIG. 11 to select the relay device 3 used to relay a session. For example, the relay-device management unit 55 may select the relay device 3 near the source terminal based on the IP address of each of the relay devices 3 stored in the relay-device management table 1100 and the IP address of the source terminal. Alternatively, the relay-device management unit 55 may select the relay device 3 based on, for example, the maximum data transmission rate of each of the relay devices 3 stored in the relay-device management table 1100.

According to the present embodiment, the relay device 3 used to relay a session may be selected by using any method. The number of the relay devices 3 included in the communication system 100 may be one.

The stroke-information management unit 56 stores and manages the stroke data transmitted via, for example, the session sei from the electronic whiteboard 1, which is a participant of a session, in relation to the session ID in the storage unit 5000, etc. For example, the stroke-information management unit 56 stores the stroke data received from the electronic whiteboard 1 in the stroke information 5006 illustrated in FIG. 12. The stroke-information management unit 56 transfers the stroke data received from the electronic whiteboard 1, for example, to the different electronic whiteboard 1 that is a participant of the same session as that of the electronic whiteboard 1.

Based on the group operation information designating one or more pieces of stroke data, which is the operation target, and received by the data exchange unit 51 from the electronic whiteboard 1, the operation restriction unit 57 restricts the operation performed by the different electronic whiteboard 1 regarding the designated stroke data. The process performed by the operation restriction unit 57 and the group operation information are described later.

The storing/reading processing unit 58 performs, for example, the process to store various types of data in the storage unit 5000 and the process to read various types of data stored in the storage unit 5000.

Functional Configuration of the Image Storage Device

The image storage device 7 uses, for example, the CPU 401 illustrated in FIG. 4 to execute a predetermined program so as to implement a data exchange unit 71, a storing/reading processing unit 72, etc. The image storage device 7 includes a storage unit 7000 that is implemented by using the RAM 403, the HD 404, etc. illustrated in FIG. 4.

Each Functional Configuration of the Image Storage Device

The data exchange unit 71 exchanges various types of data (or information) with a different terminal, device, or system via the communication network 500. The storing/reading processing unit 72 performs, for example, the process to store various types of data in the storage unit 7000 or the process to read various types of data stored in the storage unit 7000.

With the above-described configuration, for example, the image storage device 7 stores the image data uploaded from the electronic whiteboard 1 in a specified uniform resource locator (URL) and provides the image data stored in a specified URL in response to a request from the electronic whiteboard 1.

Functional Configuration of the Relay Device

The relay device 3 uses, for example, the CPU 401 illustrated in FIG. 4 to execute a predetermined program so as to implement a data exchange unit 31, a determination unit 32, a storing/reading processing unit 33, etc. The relay device 3 includes a storage unit 3000 that is implemented by using the RAM 403, the HD 404, etc. illustrated in FIG. 4.

Each Functional Configuration of the Relay Device

The data exchange unit 31 exchanges various types of data (or information) with a different terminal, device, or system via the communication network 500. The data exchange unit 31 also serves as a transfer unit that, for example, transfers video data and audio data received from the electronic whiteboard 1 to the different electronic whiteboard 1 that is a participant of the same session as that of the electronic whiteboard 1. The determination unit 32 makes various determinations such as determination on a data delay state.

The storing/reading processing unit 33 performs, for example, the process to store various types of data in the storage unit 3000 or the process to read various types of data stored in the storage unit 3000.

The functional configuration of the communication system 100 illustrated in FIG. 6 is an example, and the communication system 100 may be variously modified. For example, each functional configuration included in the communication management system 5 may be implemented by using the multiple computers 400. A function of the image storage device 7 may be implemented by using, for example, an external storage server of the communication system 100. At least a part of the functional configurations of the image storage device 7 and the relay device 3 may be included in the communication management system 5. The electronic whiteboard 1 is an example of the terminal apparatus. The terminal apparatus may be an information terminal that executes the application corresponding to the communication system 100.

Process Flow

Next, the process flows of a communication management method and an image processing method according to the present embodiment are described.

Process at Preparation Stage for Remote Communication

Figure 13A:
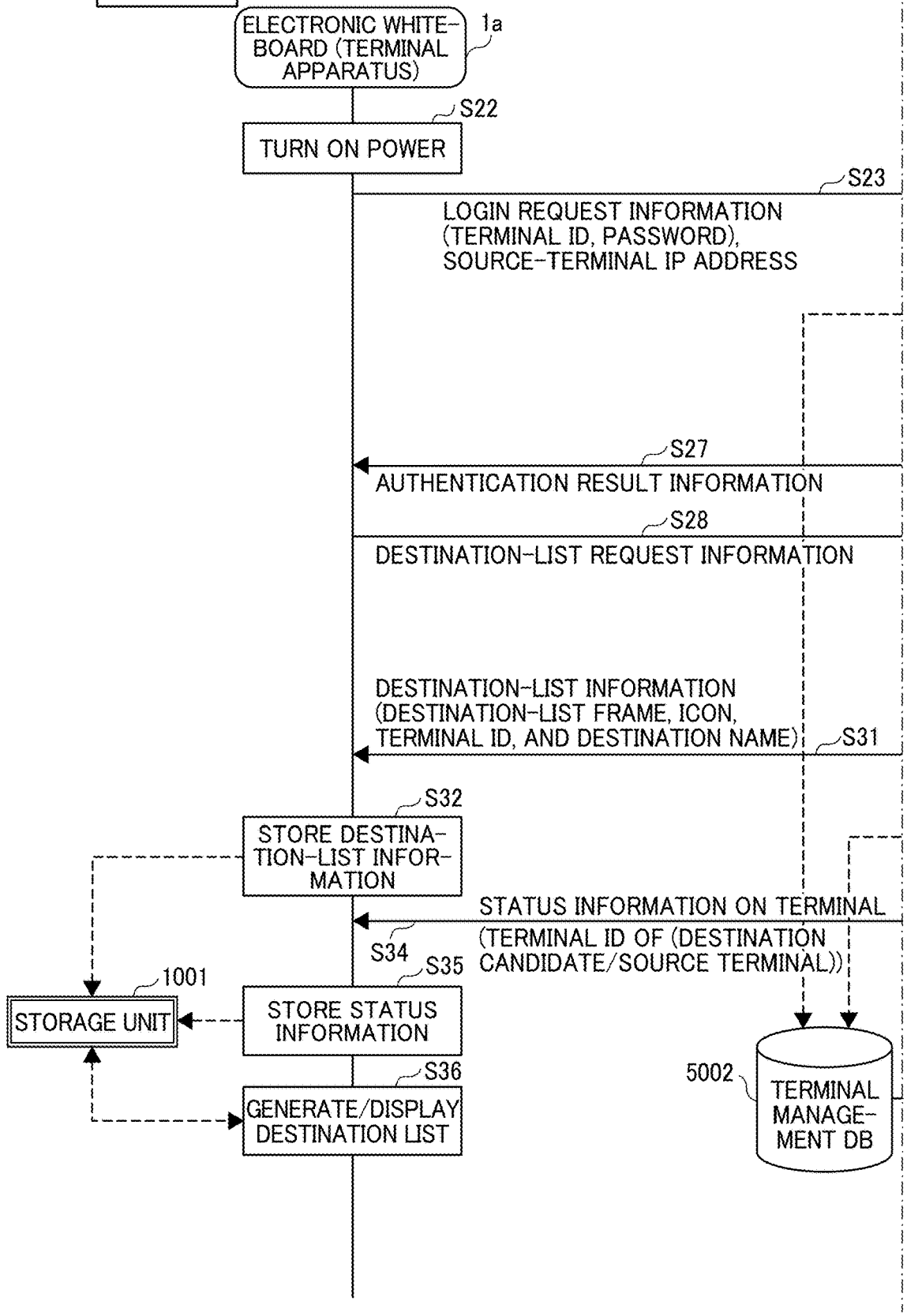
FIG. 13A and FIG. 13B are sequence diagrams illustrating an example of a process at the preparation stage according to an embodiment of the present disclosure.
Figure 13B:
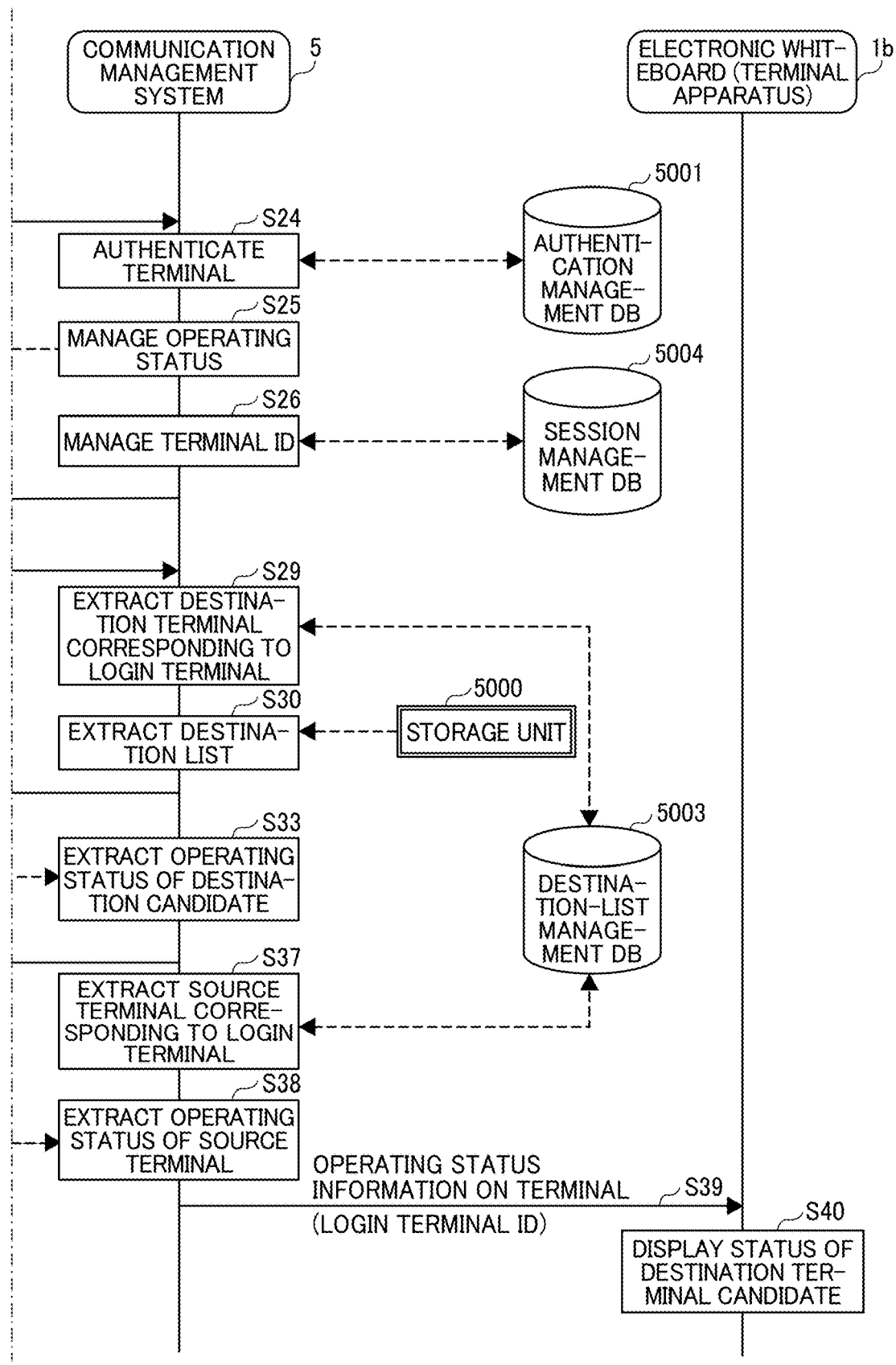

FIG. 13A and FIG. 13B are sequence diagrams illustrating an example of a process at the preparation stage according to an embodiment of the present disclosure. The process illustrated here is an example of the process at the preparation stage performed before the electronic whiteboard 1 participates in a session (video conference) in the communication system 100.

First, when the power switch 117 of the electronic whiteboard 1a is turned on, the acceptance unit 12 receives the power-on (step S22).

Subsequently, the data exchange unit 11 transmits the login request information for requesting the login to the communication management system 5 via the communication network 500 (step S23). The login request information includes, for example, the terminal ID of the electronic whiteboard 1a, a password, etc.

Subsequently, the authentication unit 52 of the communication management system 5 searches the authentication management table 700 illustrated in FIG. 7 by using the terminal ID and the password included in the login request information received via the data exchange unit 51 as search keys. When the combination of the terminal ID and the password included in the login request information is managed in the authentication management table 700, the authentication unit 52 permits the login of the electronic whiteboard 1a (step S24). When the combination of the terminal ID and the password included in the login request information is managed in the authentication management table 700, the process in step S25 and subsequent steps is executed.

When the login of the electronic whiteboard 1a is permitted, the terminal management unit 53 updates the information corresponding to the terminal ID "01aa" of the electronic whiteboard 1a in the terminal management table 800 illustrated in FIG. 8. For example, the terminal management unit 53 changes the information "operating status" corresponding to the terminal ID "01aa" to "online (communication enabled)" and updates the information "time and date of reception" to the time and date of reception of the login request information (step S25). The IP address transmitted from the electronic whiteboard 1a in step S23 described above may be used as the IP address information on the terminal instead of the one previously registered. Thus, as illustrated in FIG. 8, for example, the terminal ID "01aa" is related to the operating status "online (communication enabled)", the time and date of reception "2015.4.10.13:40", the IP address "1.2.1.3", etc. in the terminal management table 800 for management.

Subsequently, the session management unit 54 adds the new record in which the terminal ID "01aa" of the electronic whiteboard 1a received at the above-described step S23 is the "terminal ID of the source terminal" to the session management table 1000 illustrated in FIG. 10 and manages the session management table 1000 (step S26). Then, the data exchange unit 51 of the communication management system 5 transmits the authentication result information indicating the authentication result obtained during the process in step S24 to the electronic whiteboard 1a, which has requested the login, via the communication network 500 (step S27).

When receiving the authentication result information indicating the permission of login, the data exchange unit 11 of the electronic whiteboard 1a transmits the destination-list request information indicating the request for a destination list to the communication management system 5 via the communication network 500 (step S28). Accordingly, the data exchange unit 51 of the communication management system 5 receives the destination-list request information.

Subsequently, the terminal management unit 53 searches the destination-list management table 900 illustrated in FIG. 9 by using the terminal ID "01aa" of the electronic whiteboard 1a as a search key to read the terminal ID of the destination candidate that may communicate with the electronic whiteboard 1a. The terminal management unit 53 reads the destination name corresponding to the terminal ID of the destination candidate from the terminal management table 800 illustrated in FIG. 8 (step S29). Thus, the terminal ID of each of the destination candidates corresponding to the terminal ID "01aa" of the electronic whiteboard 1a and the destination name corresponding to the terminal ID are extracted.

Subsequently, the data exchange unit 51 of the communication management system 5 reads, for example, the data on the destination-list frame and the data on the icon indicating the operating status stored in the storage unit 5000 via the storing/reading processing unit 58 (step S30). The data exchange unit 51 of the communication management system 5 transmits the "destination-list information (the destination-list frame, the icon, the terminal ID, and the destination name)" including the read destination-list frame and icon and the terminal ID and the destination name extracted in step S29 to the electronic whiteboard 1a (step S31). Accordingly, in the electronic whiteboard 1a, the data exchange unit 11 receives the destination-list information, and the storing/reading processing unit 18 stores the received destination-list information in the storage unit 1001 (step S32).

As described above, according to the present embodiment, each of the electronic whiteboards 1 does not manage the destination-list information but the communication management system 5 centrally manages the pieces of destination-list information on all the terminals. Thus, it is possible to save the task performed by each of the electronic whiteboards 1 to change the destination-list information even when the new electronic whiteboard 1 is registered in the communication management system 5, when a terminal apparatus with a new model is registered instead of the already registered electronic whiteboard 1, or when the appearance of the destination-list frame, or the like, is changed.

The terminal management unit 53 of the communication management system 5 searches the terminal management table 800 illustrated in FIG. 8 by using the terminal ID of the destination candidate extracted in step S29 as a search key to read the corresponding operating status for each of the terminal IDs of the destination candidates. Accordingly, the terminal management unit 53 acquires the operating status of each of the electronic whiteboards 1 corresponding to the terminal ID of the destination candidate (step S33).

Subsequently, the data exchange unit 51 of the communication management system 5 transmits the "terminal status information" including the terminal ID used as the search key in step S33 and the operating status of the corresponding destination terminal to the electronic whiteboard 1a via the communication network 500 (step S34).

Subsequently, the storing/reading processing unit 18 of the electronic whiteboard 1a sequentially stores the terminal status information received from the communication management system 5 in the storage unit 1001 (step S35). Thus, the electronic whiteboard 1a may receive the status information on each of the electronic whiteboards 1 to acquire the current operating statuses of the electronic whiteboard 1b, the electronic whiteboard 1c, etc., which are destination candidates that may communicate with the electronic whiteboard 1a.

Subsequently, the display controller 14 of the electronic whiteboard 1a generates the destination list reflecting the status of the terminal that is a destination candidate based on the destination-list information stored in the storage unit 1001 and the terminal status information. The display controller 14 causes the display 160 of the electronic whiteboard 1a to present the destination-list screen using the generated destination list (step S36).

The terminal management unit 53 of the communication management system 5 searches the destination-list management table 900 illustrated in FIG. 9 based on the terminal ID "01aa" of the electronic whiteboard 1a to extract the terminal ID of a different terminal that registers the electronic whiteboard 1a as a destination candidate (step S37).

Subsequently, the terminal management unit 53 of the communication management system 5 searches the terminal management table 800 illustrated in FIG. 8 based on the terminal ID "01aa" of the electronic whiteboard 1a to acquire the operating status of the electronic whiteboard 1a (step S38).

Then, the data exchange unit 51 transmits the "terminal status information" including the terminal ID and the operating status of the electronic whiteboard 1a to the electronic whiteboard 1 with the terminal ID, of which the operating status is "online" in the terminal management table 800, among the terminal IDs extracted in step S37 (step S39). When the terminal status information is transmitted to each of the electronic whiteboards 1, the data exchange unit 51 refers to the IP address of the electronic whiteboards 1 managed in the terminal management table 800 based on the terminal ID. Thus, it is possible to notify each of the electronic whiteboards 1 that may communicate with the electronic whiteboard 1a as a destination candidate of the terminal ID "01aa" and the operating status "online" of the electronic whiteboard 1a. Accordingly, each of the electronic whiteboards 1, which is a destination candidate, may display the status of the electronic whiteboard 1a (step S40).

Session Start Process

Figure 14:
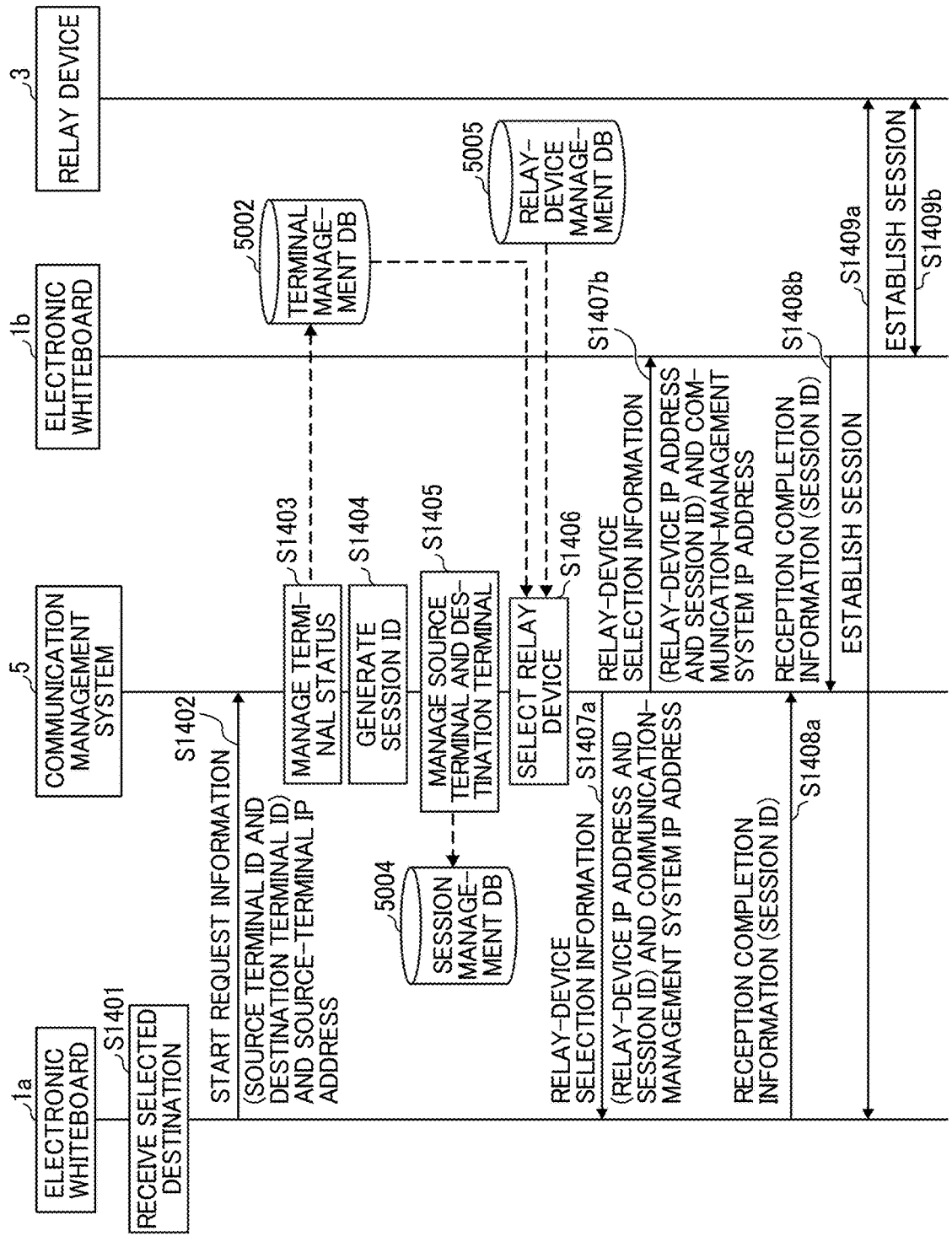
FIG. 14 is a sequence diagram illustrating an example of a session start process according to an embodiment of the present disclosure.

FIG. 14 is a sequence diagram illustrating an example of a session start process according to an embodiment of the present disclosure. This process is an example of the session start process performed by the communication system 100 when the electronic whiteboard 1a gives a session start request to the electronic whiteboard 1b.

When the electronic whiteboard 1a, which is a source terminal, receives the destination selected by the user A in step S1401, the process in step S1402 and subsequent steps is executed. Here, the user A selects the electronic whiteboard 1b as a destination terminal.

After the electronic whiteboard 1a receives the destination selected by the user A, the data exchange unit 11 of the electronic whiteboard 1a transmits the start request information for requesting the start of a session to the communication management system 5 in step S1402. The start request information includes, for example, the terminal ID "01aa" of the electronic whiteboard 1a that is the source terminal, the terminal ID "01ba" of the electronic whiteboard 1b that is the destination terminal, and the IP address of the electronic whiteboard 1a that is the source terminal. As a result, the data exchange unit 51 of the communication management system 5 receives the IP address of the source terminal (the electronic whiteboard 1a), which is a transmission source, as well as the start request information.

In step S1403, the terminal management unit 53 of the communication management system 5 updates the terminal management DB 5002 based on the terminal ID of the source terminal and the terminal ID of the destination terminal included in the start request information. For example, the terminal management unit 53 updates the "operating status" corresponding to each of the terminal IDs "01aa" and "01ba" to "online (communication being executed)" in the terminal management table 800 based on the terminal ID "01aa" of the source terminal and the terminal ID "01ba" of the destination terminal included in the start request information. In this state, although the electronic whiteboard 1a, which is the source terminal, and the electronic whiteboard 1b, which is the destination terminal, are not participating in the session, the electronic whiteboard 1a and the electronic whiteboard 1b are managed as being in the state of executing the communication.

In step S1404, the session management unit 54 of the communication management system 5 generates the session ID for identifying the session held between the electronic whiteboard 1a and the electronic whiteboard 1b. Here, the session management unit 54 generates the session ID "se01".

In step S1405, the session management unit 54 stores the generated session ID, the terminal ID "01aa" of the source terminal, the terminal ID "01ba" of the destination terminal, and the like, in relation with one another in the session management table 1000 illustrated in FIG. 10 for management.

In step S1406, the relay-device management unit 55 of the communication management system 5 selects the relay device 3 that relays the session between the source terminal (the electronic whiteboard 1a) and the destination terminal (the electronic whiteboard 1b). For example, the relay-device management unit 55 selects the relay device 3 having the IP address that is close to the IP address of the source terminal (the electronic whiteboard 1a) in the terminal management table 800 with regard to the device IDs of the relay devices 3 whose operating status is "online" in the relay-device management table 1100. Here, the relay device 3 having the device ID "111a" is selected.

In steps S1407a and S1407b, the session management unit 54 of the communication management system 5 transmits the relay-device selection information to the source terminal (the electronic whiteboard 1a) and the destination terminal (the electronic whiteboard 1b) via the data exchange unit 51. The relay-device selection information includes, for example, the IP address of the relay device 3 selected in step S1406, the session ID generated in step S1404, and the IP address of the communication management system 5.

After receiving the relay-device selection information, the data exchange units 11 of the source terminal (the electronic whiteboard 1a) and the destination terminal (the electronic whiteboard 1b) transmit, to the communication management system 5, the reception completion information indicating that the relay-device selection information has been received in steps S1408a and S1408b. The reception completion information includes, for example, the session ID "se01" included in the relay-device selection information. In steps S1409a and S1409b, the data exchange units 11 of the source terminal (the electronic whiteboard 1a) and the destination terminal (the electronic whiteboard 1b) use the device ID of the relay device 3 and the session ID included in the relay-device selection information to establish a session with the relay device 3. This allows the electronic whiteboard 1a and the electronic whiteboard 1b to participate in the session with the same session ID "se01" and exchange, for example, video data or audio data of the conference video with each other via the relay device 3.

By the above-described process, the user A of the electronic whiteboard 1a and the user B of the electronic whiteboard 1b may exchange a conference video, and the like, to have a video conference.

Process to Share Stroke Image

The communication system 100 allows the other electronic whiteboards 1 to display, as a shared image, the stroke image drawn on the electronic whiteboard 1 with the electronic pen 140, etc. for the user A of the electronic whiteboard 1a and the users B and C of the electronic whiteboard 1b participating in the video conference. Here, an example of the process to share a stroke image between the electronic whiteboard 1a and the electronic whiteboard 1b participating in the same session is described.

Figure 15:
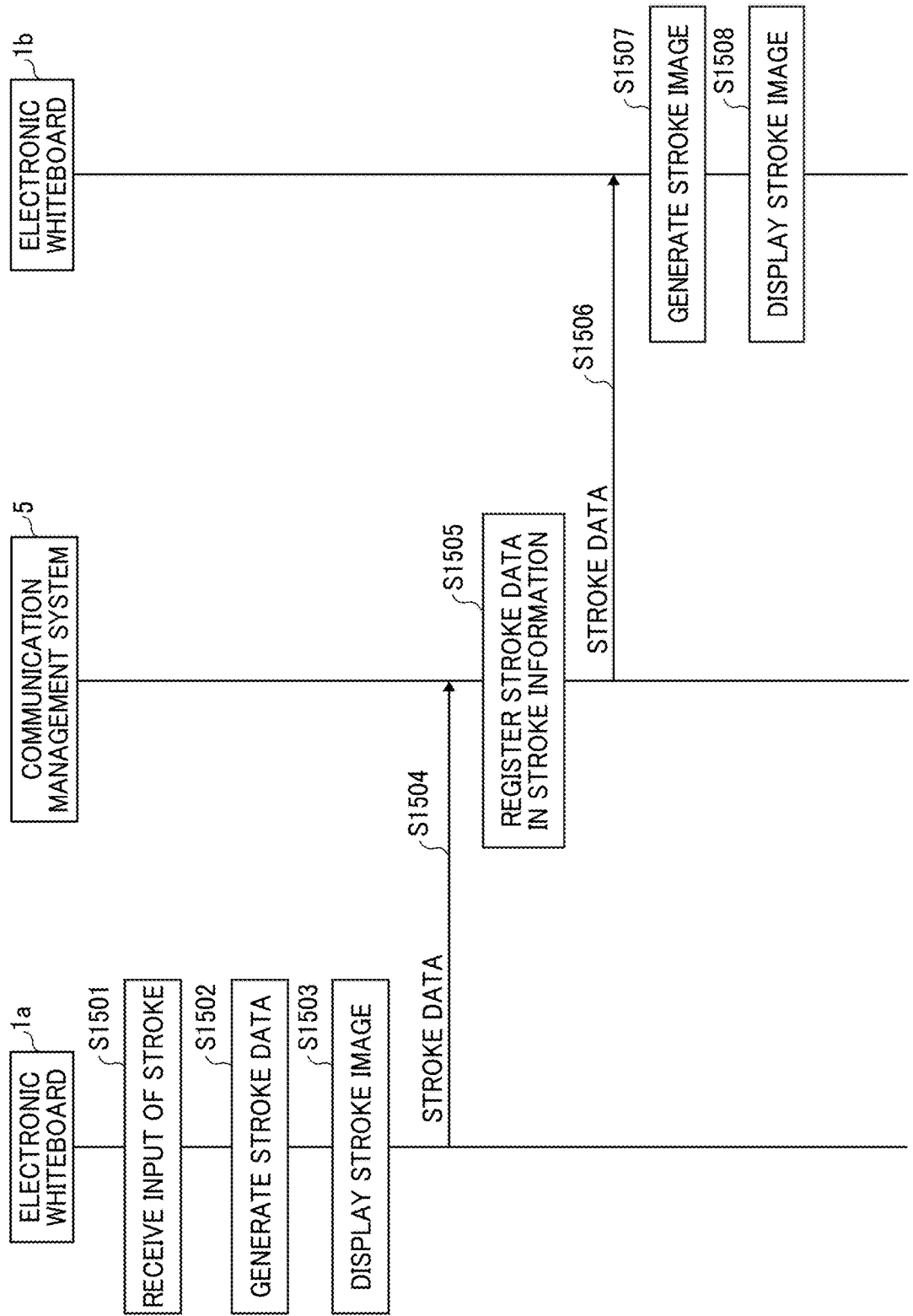
FIG. 15 is a sequence diagram illustrating an example of the process to share a stroke image according to an embodiment of the present disclosure.

FIG. 15 is a sequence diagram illustrating an example of the process to share a stroke image according to an embodiment of the present disclosure. At the start of the process illustrated in FIG. 15, the electronic whiteboard 1a and the electronic whiteboard 1b are participating in the same session due to the session start process illustrated in FIG. 14.

The electronic whiteboard 1a and the electronic whiteboard 1b share a document image and display the document image on the display 160 via the image storage device 7 as appropriate.

In step S1501, when the user A makes a drawing (movement) with the electronic pen 140 or the hand H in contact with the display 160 of the electronic whiteboard 1a, the acceptance unit 12 receives an input of the drawn stroke (trajectory).

In step S1502, the image processing unit 15 of the electronic whiteboard 1a generates the stroke data for displaying the stroke image corresponding to the stroke received by the acceptance unit 12.

In step S1503, the display controller 14 of the electronic whiteboard 1a causes the display 160 to present the stroke image based on the stroke data generated by the image processing unit 15. This allows the stroke image drawn by the user A with the electronic pen 140, or the like, on the display 160 to be presented on the display 160.

In step S1504, the data exchange unit 11 of the electronic whiteboard 1a transmits the stroke data for reproducing the stroke image drawn by the user A to the communication management system 5 during, for example, the session sei. Accordingly, the data exchange unit 51 of the communication management system 5 receives the stroke data transmitted from the electronic whiteboard 1a.

In step S1505, the stroke-information management unit 56 of the communication management system 5 registers the stroke data received from the electronic whiteboard 1a in, for example, the stroke information 5006 illustrated in FIG. 12.

In step S1506, the stroke-information management unit 56 of the communication management system 5 transfers the stroke data to the electronic whiteboard 1b participating in the same session as that of the electronic whiteboard 1a. The data exchange unit 11 of the electronic whiteboard 1b receive the stroke data.

In step S1507, the image processing unit 15 of the electronic whiteboard 1b generates a stroke image based on the stroke data received by the data exchange unit 11.

In step S1508, the display controller 14 of the electronic whiteboard 1b causes the display 160 to present the stroke image generated by the image processing unit 15, i.e., the stroke image drawn by the user A in step S1501.

When the user B or the user C makes a drawing on the electronic whiteboard 1b with the electronic pen 140, or the like, the electronic whiteboard 1a may display the stroke image in the same manner.

Thus, the electronic whiteboard 1a and the electronic whiteboard 1b participating in the same session may share the stroke image.

Process to Move Stroke Image

During the conference where the electronic whiteboard (terminal apparatus) 1a and the electronic whiteboard 1b share a stroke image, the electronic whiteboards 1a and 1b may perform an editing process such as a moving process on the shared stroke image. In this case, for example, when the electronic whiteboard 1a and the electronic whiteboard 1b perform a moving operation on the shared stroke image, an operation different from the operation intended by the user may be performed on the stroke image in some operation timing.

In order to solve the above-described disadvantage, the communication management system 5 has an operation restriction function to, for example, restrict the user B's editing operation on the stroke image, which is the operation target, when the user A is performing an editing operation on the stroke image.

Before the operation restriction function is described, an example of the process to move a stroke image without use of the operation restriction function is described.

Figure 16:
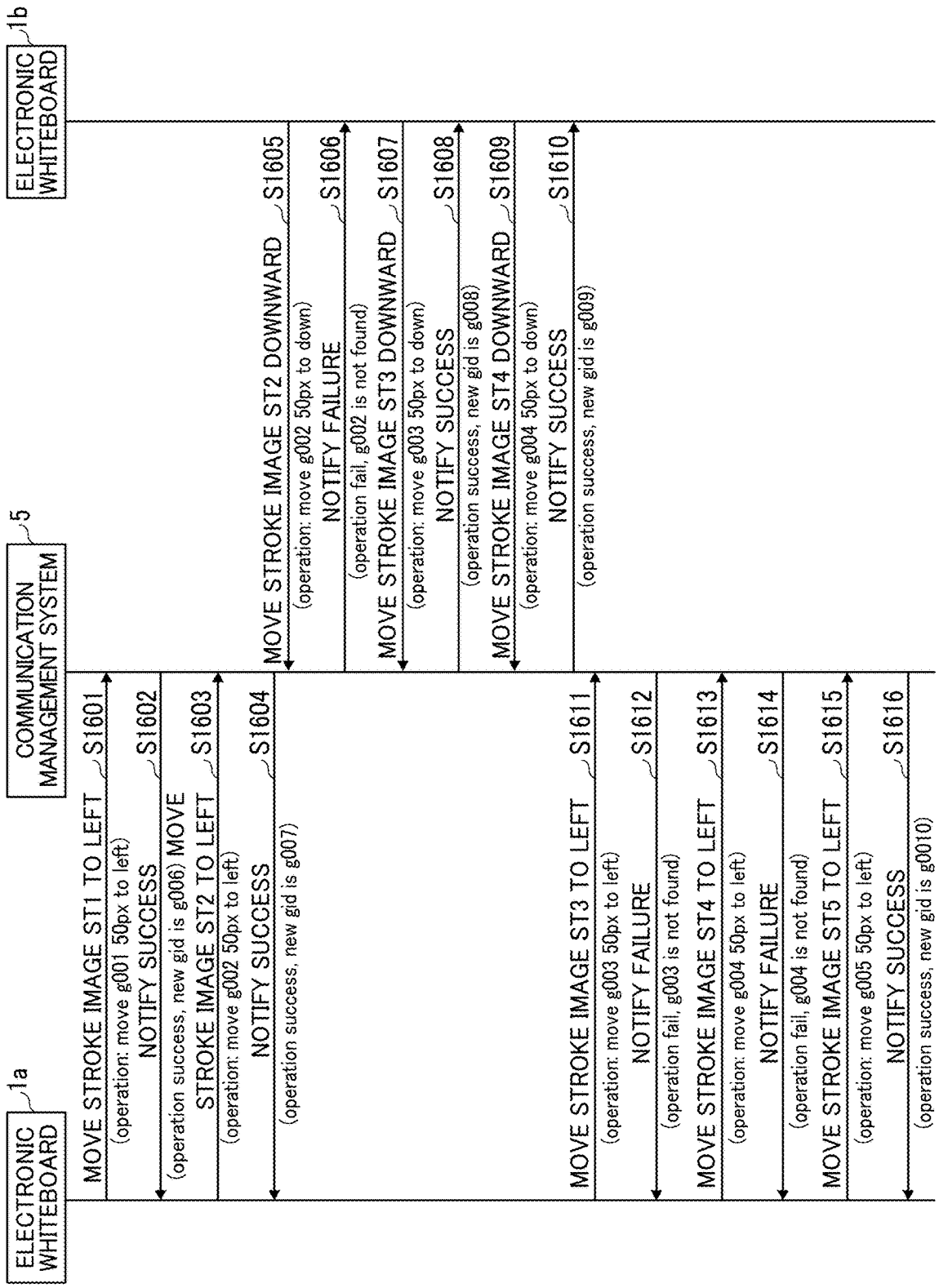
FIG. 16 is a sequence diagram illustrating an example of the process to move a stroke image according to an embodiment of the present disclosure.
Figure 17A:
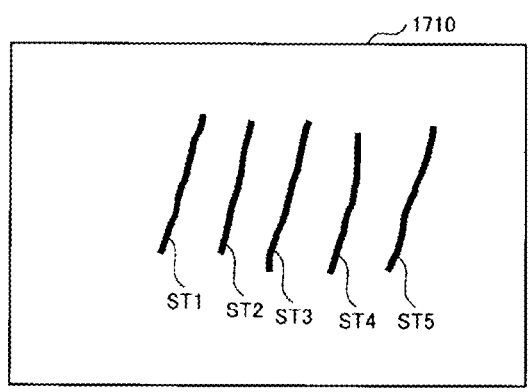
FIGS. 17A to 17G are diagrams illustrating examples of a display screen according to an embodiment of the present disclosure.

FIG. 16 is a sequence diagram illustrating an example of the process to move a stroke image according to an embodiment of the present disclosure. At the start of the process illustrated in FIG. 16, for example, the displays of the electronic whiteboard 1a and the electronic whiteboard 1b present a display screen 1710 including stroke images ST1 to ST5 as illustrated in FIG. 17A due to the stroke-image sharing process illustrated in FIG. 15. The stroke information 5006 managed by the stroke-information management unit 56 of the communication management system 5 includes stroke data (the first stroke to the fifth stroke) corresponding to the stroke images ST1 to ST5 as illustrated in, for example, FIG. 12.

Here, as an example for the description, the user A of the electronic whiteboard 1a performs the operation to sequentially move the stroke images ST1 to ST5 to left, and the user B of the electronic whiteboard 1b performs the operation to sequentially move the stroke images ST2 to ST4 downward.

In step S1601, the information transmission unit 16 of the electronic whiteboard 1a transmits, to the communication management system 5, the operation information for moving the stroke image ST1 (Gid=g001) to left by a predetermined distance in accordance with the user A's operation to move the stroke image ST1. The operation information includes, for example, the coordinate information after the movement of the stroke image ST1.

Figure 17B:
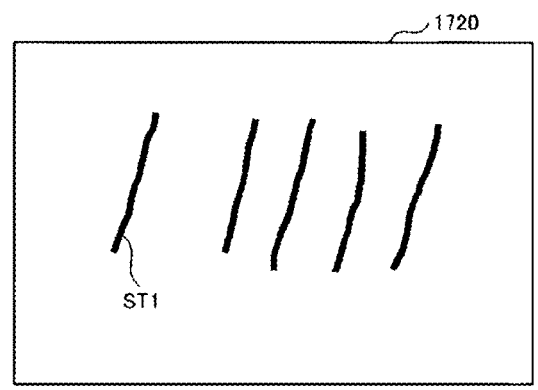

Accordingly, for example, the stroke-information management unit 56 of the communication management system 5 updates the first drawing data and the Gid of the first stroke corresponding to the stroke image ST1 (Gid=g001) in the stroke information 5006 illustrated in FIG. 12. Thus, the stroke image ST1 shared by the electronic whiteboard 1a and the electronic whiteboard 1b has moved to left as illustrated in, for example, a display screen 1720 in FIG. 17B.

In step S1602, the stroke-information management unit 56 of the communication management system 5 transmits, to the electronic whiteboard 1a, the success notification indicating that the stroke image ST1 has been successfully moved. The success notification includes the updated Gid (e.g., Gid=g006) of the stroke image ST1.

Figure 17C:
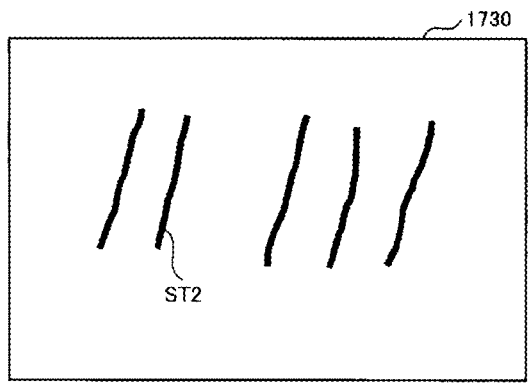

In step S1603, the information transmission unit 16 of the electronic whiteboard 1a transmits, to the communication management system 5, the operation information for moving the stroke image ST2 (Gid=g002) to left by a predetermined distance in accordance with the user A's operation to move the stroke image ST2. Accordingly, for example, the stroke-information management unit 56 of the communication management system 5 updates the second drawing data and the Gid of the second stroke corresponding to the stroke image ST2 (Gid=g002) in the stroke information 5006 illustrated in FIG. 12. Thus, the stroke image ST2 shared by the electronic whiteboard 1a and the electronic whiteboard 1b has moved to left as illustrated in, for example, a display screen 1730 in FIG. 17C.

In step S1604, the stroke-information management unit 56 of the communication management system 5 transmits, to the electronic whiteboard 1a, the success notification indicating that the stroke image ST2 has been successfully moved. The success notification includes the updated Gid (e.g., Gid=g007) of the stroke image ST2.

In step S1605, the information transmission unit 16 of the electronic whiteboard 1b transmits, to the communication management system 5, the operation information for moving the stroke image ST2 (Gid=g002) downward by a predetermined distance in accordance with the user B's operation to move the stroke image ST2. However, as the Gid of the stroke image ST2 has been updated to "g007", it is difficult for the stroke-information management unit 56 of the communication management system 5 to perform the operation to move the stroke image ST2 (Gid=g002).

In step S1606, the stroke-information management unit 56 of the communication management system 5 transmits, to the electronic whiteboard 1b, the failure notification indicating that the movement of the stroke image ST2 has failed.

Figure 17D:
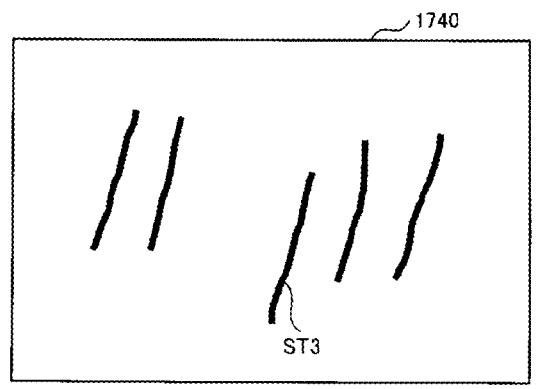

In step S1607, the information transmission unit 16 of the electronic whiteboard 1b transmits, to the communication management system 5, the operation information for moving the stroke image ST3 (Gid=g003) downward by a predetermined distance in accordance with the user B's operation to move the stroke image ST3. Accordingly, for example, the stroke-information management unit 56 of the communication management system 5 updates the third drawing data and the Gid of the third stroke corresponding to the stroke image ST3 (Gid=g003) in the stroke information 5006 illustrated in FIG. 12. Thus, the stroke image ST3 shared by the electronic whiteboard 1a and the electronic whiteboard 1b has moved downward as illustrated in, for example, a display screen 1740 in FIG. 17D.

In step S1608, the stroke-information management unit 56 of the communication management system 5 transmits, to the electronic whiteboard 1b, the success notification indicating that the stroke image ST3 has been successfully moved. The success notification includes the updated Gid (e.g., Gid=g008) of the stroke image ST3.

Figure 17E:
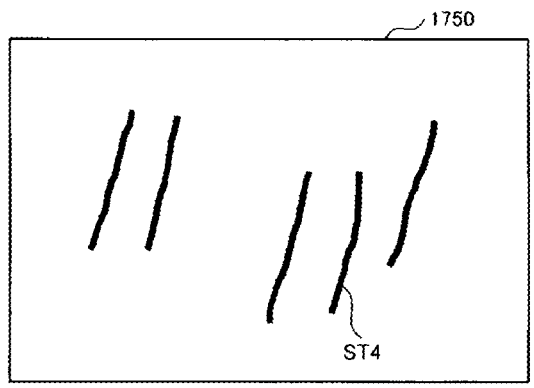

In step S1609, the information transmission unit 16 of the electronic whiteboard 1b transmits, to the communication management system 5, the operation information for moving the stroke image ST4 (Gid=g004) downward by a predetermined distance in accordance with the user B's operation to move the stroke image ST4. Accordingly, for example, the stroke-information management unit 56 of the communication management system 5 updates the fourth drawing data and the Gid of the fourth stroke corresponding to the stroke image ST4 (Gid=g004) in the stroke information 5006 illustrated in FIG. 12. Thus, the stroke image ST4 shared by the electronic whiteboard 1a and the electronic whiteboard 1b has moved downward as illustrated in, for example, a display screen 1750 in FIG. 17E.

In step S1610, the stroke-information management unit 56 of the communication management system 5 transmits, to the electronic whiteboard 1b, the success notification indicating that the stroke image ST4 has been successfully moved. The success notification includes the updated Gid (e.g., Gid=g009) of the stroke image ST4.

In step S1611, the information transmission unit 16 of the electronic whiteboard 1a transmits, to the communication management system 5, the operation information for moving the stroke image ST3 (Gid=g003) to left by a predetermined distance in accordance with the user A's operation to move the stroke image ST3. However, as the Gid of the stroke image ST3 has been updated to "g008", it is difficult for the stroke-information management unit 56 of the communication management system 5 to perform the operation to move the stroke image ST3 (Gid=g003).

In step S1612, the stroke-information management unit 56 of the communication management system 5 transmits, to the electronic whiteboard 1a, the failure notification indicating that the movement of the stroke image ST3 has failed.

In step S1613, the information transmission unit 16 of the electronic whiteboard 1a transmits, to the communication management system 5, the operation information for moving the stroke image ST4 (Gid=g004) to left by a predetermined distance in accordance with the user A's operation to move the stroke image ST4. However, as the Gid of the stroke image ST4 has been updated to "g009", it is difficult for the stroke-information management unit 56 of the communication management system 5 to perform the operation to move the stroke image ST4 (Gid=g004).

In step S1614, the stroke-information management unit 56 of the communication management system 5 transmits, to the electronic whiteboard 1a, the failure notification indicating that the movement of the stroke image ST4 has failed.

In step S1615, the information transmission unit 16 of the electronic whiteboard 1a transmits, to the communication management system 5, the operation information for moving the stroke image ST5 (Gid=g005) to left by a predetermined distance in accordance with the user A's operation to move the stroke image ST5. Accordingly, for example, the stroke-information management unit 56 of the communication management system 5 updates the fifth drawing data and the Gid of the fifth stroke corresponding to the stroke image ST5 (Gid=g005) in the stroke information 5006 illustrated in FIG. 12. Thus, the stroke image ST5 shared by the electronic whiteboard 1a and the electronic whiteboard 1b has moved to left as illustrated in, for example, a display screen 1760 in FIG. 17F.

In step S1616, the stroke-information management unit 56 of the communication management system 5 transmits, to the electronic whiteboard 1a, the success notification indicating that the stroke image ST5 has been successfully moved. The success notification includes the updated Gid (e.g., Gid=g010) of the stroke image ST5.

Figure 17F:
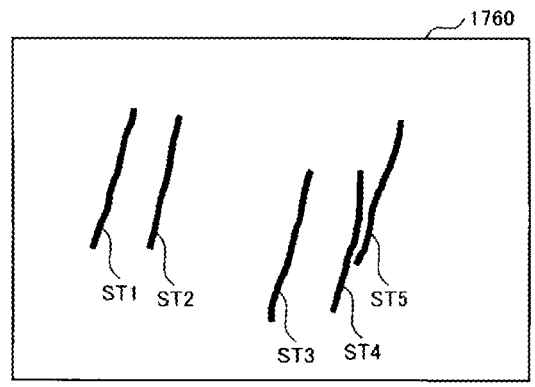

As described above, without use of the operation restriction function, the stroke images ST1, ST2, and ST5 have moved to left in accordance with the operations of the user A and the stroke images ST3 and ST4 have moved downward in accordance with the operations of the user B, as illustrated in the display screen 1760 in FIG. 17F. As a result, the stroke images ST1 to ST5 have moved to positions different from the positions intended by the user A and the user B.

In order to solve the above-described disadvantage, the communication management system 5 has the operation restriction function to, for example, restrict the user B's editing operation on the stroke image, which is the operation target, when the user A is performing an editing operation on the stroke image.

First Embodiment

Figure 18:
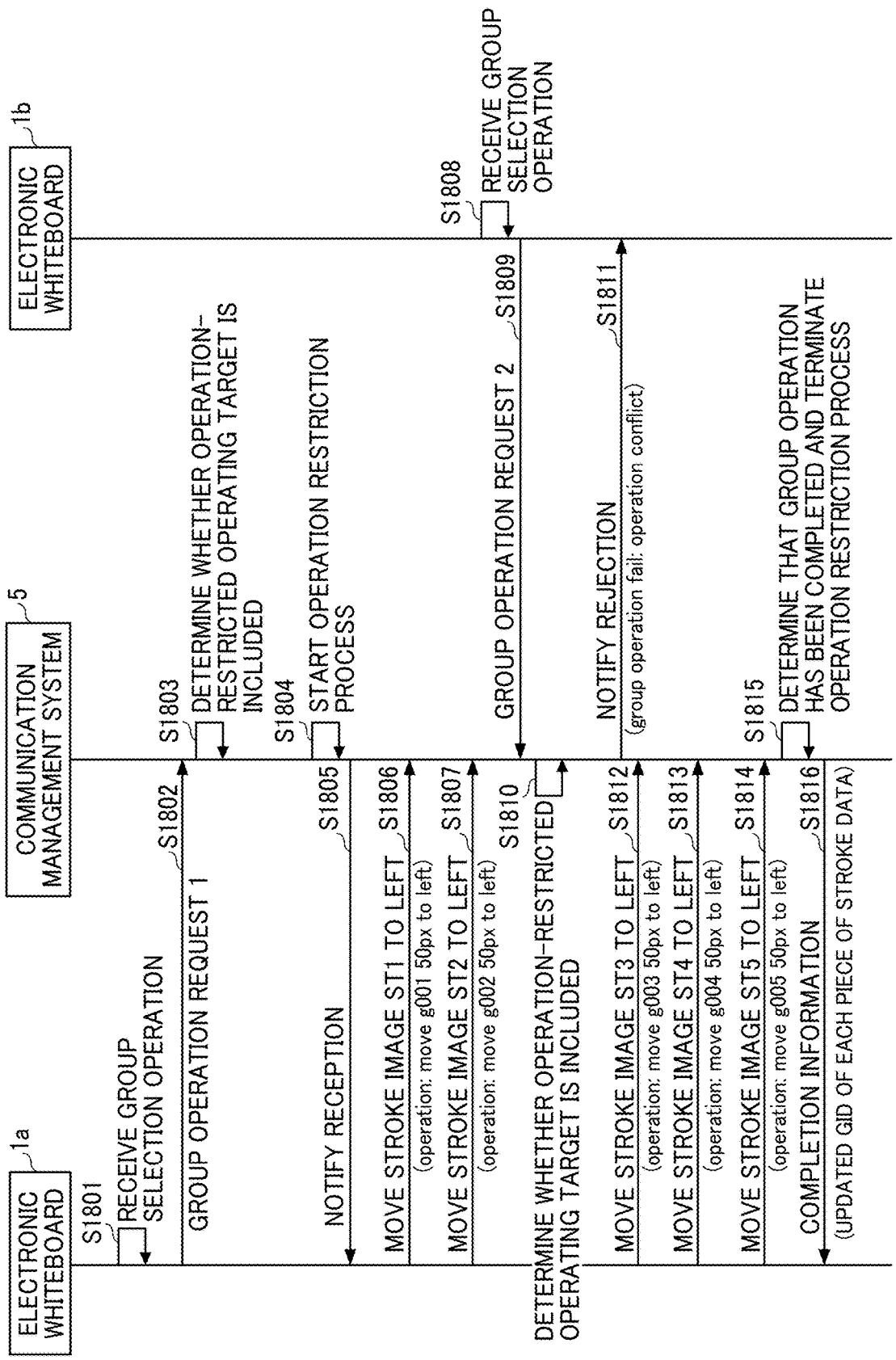
FIG. 18 is a first sequence diagram illustrating an example of an operation restriction process according to the first embodiment of the present disclosure.

FIG. 18 is a first sequence diagram illustrating an example of the operation restriction process according to the first embodiment of the present disclosure. This process is an example of the operation restriction process performed by the operation restriction unit 57 of the communication management system 5.

At the start of the process illustrated in FIG. 18, for example, the displays of the electronic whiteboard 1a and the electronic whiteboard 1b present the display screen 1710 including the stroke images ST1 to ST5 as illustrated in FIG. 17A due to the stroke-image sharing process illustrated in FIG. 15. The stroke information 5006 managed by the stroke-information management unit 56 of the communication management system 5 includes the stroke data (the first stroke to the fifth stroke) corresponding to the stroke images ST1 to ST5 as illustrated in, for example, FIG. 12.

Here, as an example for the description, the user A of the electronic whiteboard 1a performs the operation to sequentially move the stroke images ST1 to ST5 to left.

In step S1801, the acceptance unit 12 of the electronic whiteboard 1a accepts the group selection operation from the user A.

According to the present embodiment, before performing an editing operation on a shared stroke image, the user may select the stroke image, which is the operation target, to notify the communication management system 5 of the list of stroke data to be operated.

In step S1802, the information transmission unit 16 of the electronic whiteboard 1a transmits, to the communication management system 5, a first group operation request for designating one or more pieces of stroke data, which is the operation target, in accordance with the user A's group selection operation. The first group operation request is an example of the group operation information for designating one or more pieces of stroke data that is the operation target.

FIG. 19A illustrates an example of group operation information 1910 (the first group operation request) transmitted by the information transmission unit 16 of the electronic whiteboard 1a to the communication management system 5. In the group operation information 1910 illustrated in FIG. 19A, the character string ""lock":"abcdefg"" is the information for destinating the identification information identifying the conference (session) that is the operation target. The example of FIG. 19A indicates that the stroke information, which is the operation target, is for example the stroke information 5006 on the conference (id=abcdefg) illustrated in FIG. 12.

The character string ""list": ["aaaaa","bbbbb","ccccc", "ddddd","eeeee"]" is the information for designating the stroke ID of the stroke data that is the operation target. The example of FIG. 19A indicates that the stroke data, which is the operation target, are the first stroke, the second stroke, the third stroke, the fourth stroke, and the fifth stroke.

In step S1803 in FIG. 18, when the first group operation request is received from the electronic whiteboard 1a, the operation restriction unit 57 of the communication management system 5 determines whether the operation target (stroke data) designated by the first group operation request includes an operation target (stroke data) whose operation is being restricted. When the operation target designated by the first group operation request includes no operation-restricted operation target, the process in step S1804 and subsequent steps is executed. Conversely, when the operation target designated by the first group operation request includes an operation-restricted operation target, the operation restriction unit 57 of the communication management system 5 transmits a rejection notification to the electronic whiteboard 1, which has transmitted the request, as described later.

In step S1804, the operation restriction unit 57 of the communication management system 5 starts an operation restriction process on the stroke data designated by the first group operation request. Thus, the operation restriction unit 57 prohibits the other electronic whiteboard 1b from performing operations on the stroke image designated by the first group operation request transmitted from the electronic whiteboard 1a.

In step S1805, the operation restriction unit 57 of the communication management system 5 transmits the reception notification indicating that the first group operation request has been received to the electronic whiteboard 1a that has transmitted the request.

In step S1806, the information transmission unit 16 of the electronic whiteboard 1a transmits, to the communication management system 5, the operation information for moving the stroke image ST1 (Gid=g001) to left by a predetermined distance in accordance with the user A's operation to move the stroke image ST1. Accordingly, for example, the stroke-information management unit 56 of the communication management system 5 updates the first drawing data of the first stroke corresponding to the stroke image ST1 (Gid=g001) and updates the Gid to "g006" in the stroke information 5006 illustrated in FIG. 12.

In step S1807, the information transmission unit 16 of the electronic whiteboard 1a transmits, to the communication management system 5, the operation information for moving the stroke image ST2 (Gid=g002) to left by a predetermined distance in accordance with the user A's operation to move the stroke image ST2. Accordingly, for example, the stroke-information management unit 56 of the communication management system 5 updates the second drawing data of the second stroke corresponding to the stroke image ST2 (Gid=g002) and updates the Gid to "g007" in the stroke information 5006 illustrated in FIG. 12.

Here, for example, in step S1808, the acceptance unit 12 of the electronic whiteboard 1b accepts the group selection operation from the user B.

In step S1809, the information transmission unit 16 of the electronic whiteboard 1b transmits, to the communication management system 5, a second group operation request for designating one or more pieces of stroke data, which is the operation target, in accordance with the user B's group selection operation. The second group operation request is another example of the group operation information for designating one or more pieces of stroke data that is the operation target.

FIG. 19B illustrates an example of group operation information 1920 (the second group operation request) transmitted by the information transmission unit 16 of the electronic whiteboard 1b to the communication management system 5. In the group operation information 1920 illustrated in FIG. 19B, the character string ""lock":"abcdefg"" indicates that the stroke information, which is the operation target, is for example the stroke information 5006 on the conference (id=abcdefg) illustrated in FIG. 12.

The character string ""list": ["bbbbb","ccccc","ddddd"]" indicates that the stroke data, which is the operation target, are the second stroke, the third stroke, and the fourth stroke.

In step S1810 of FIG. 18, when the second group operation request is received from the electronic whiteboard 1b, the operation restriction unit 57 of the communication management system 5 determines whether the operation target (stroke data) designated by the second group operation request includes an operation-restricted operation target (stroke data).

In step S1804, the operation restriction process starts on the stroke data with the stroke IDs "aaaaaa", "bbbbbb", "cccccc", "dddddd", and "eeeeee" based on the group operation information 1910 illustrated in FIG. 19A. Furthermore, in the group operation information 1920 illustrated in FIG. 19B, the stroke data with the stroke IDs "bbbbbb","cccccc", and "dddddd" are designated as the stroke data that is the operation target.

As described above, when all or part of the designated operation target (stroke data) is included in the operation-restricted operation target (stroke data), the operation restriction unit 57 transmits a rejection notification (or a failure notification) to the electronic whiteboard 1b, which has transmitted the request, in step 1811. In this case, the users B and C of the electronic whiteboard 1b are not allowed to perform operations on the stroke images ST2, ST3, and ST4 that are the operation target.

In step S1812, the information transmission unit 16 of the electronic whiteboard 1a transmits, to the communication management system 5, the operation information for moving the stroke image ST3 (Gid=g003) to left by a predetermined distance in accordance with the user A's operation to move the stroke image ST3. Accordingly, for example, the stroke-information management unit 56 of the communication management system 5 updates the third drawing data of the third stroke corresponding to the stroke image ST3 (Gid=g003) and updates the Gid to "g008" in the stroke information 5006 illustrated in FIG. 12.

In step S1813, the information transmission unit 16 of the electronic whiteboard 1a transmits, to the communication management system 5, the operation information for moving the stroke image ST4 (Gid=g004) to left by a predetermined distance in accordance with the user A's operation to move the stroke image ST4. Accordingly, for example, the stroke-information management unit 56 of the communication management system 5 updates the fourth drawing data of the fourth stroke corresponding to the stroke image ST4 (Gid=g004) and updates the Gid to "g009" in the stroke information 5006 illustrated in FIG. 12.

In step S1814, the information transmission unit 16 of the electronic whiteboard 1a transmits, to the communication management system 5, the operation information for moving the stroke image ST5 (Gid=g005) to left by a predetermined distance in accordance with the user A's operation to move the stroke image ST5. Accordingly, for example, the stroke-information management unit 56 of the communication management system 5 updates the fifth drawing data of the fifth stroke corresponding to the stroke image ST5 (Gid=g005) and updates the Gid to "g010" in the stroke information 5006 illustrated in FIG. 12.

In step S1815, the operation restriction unit 57 of the communication management system 5 determines that the group operation has been completed and terminates the operation restriction process when, for example, operations have been received for all the stroke data designated as the operation target.

As another example, the operation restriction unit 57 may determine that the group operation has been completed when the termination information for the group operation is received from the electronic whiteboard 1a.

The operation restriction unit 57 may terminate the operation restriction process when a predetermined time has elapsed after the operation restriction process is started. Thus, it is possible to prevent a situation where, for example, the editing for the operation target is disabled after the electronic whiteboard 1a transmits the group operation information to the communication management system 5 and then leaves the session due to a trouble, or the like, before an operation has been completed on all the stroke information that is the operation target.

In step S1816, the operation restriction unit 57 of the communication management system 5 transmits the completion information indicating the completion of the group operation to the electronic whiteboard 1a. The Gid of each piece of stroke data updated during the group operation may be notified to the electronic whiteboard 1a by using the completion information or may be notified to the electronic whiteboard 1a by using, for example, the success notification illustrated in step S1602 in FIG. 16.

Figure 17G:
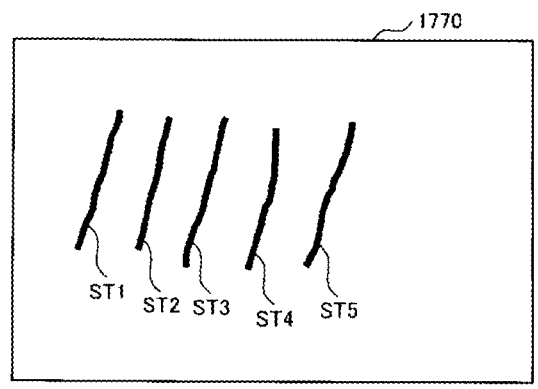

Due to the above-described process, for example, as illustrated in a display screen 1770 of FIG. 17G, the stroke images ST1 to ST5, which are the operation targets, are moved to left as intended by the user A.

Figure 20:
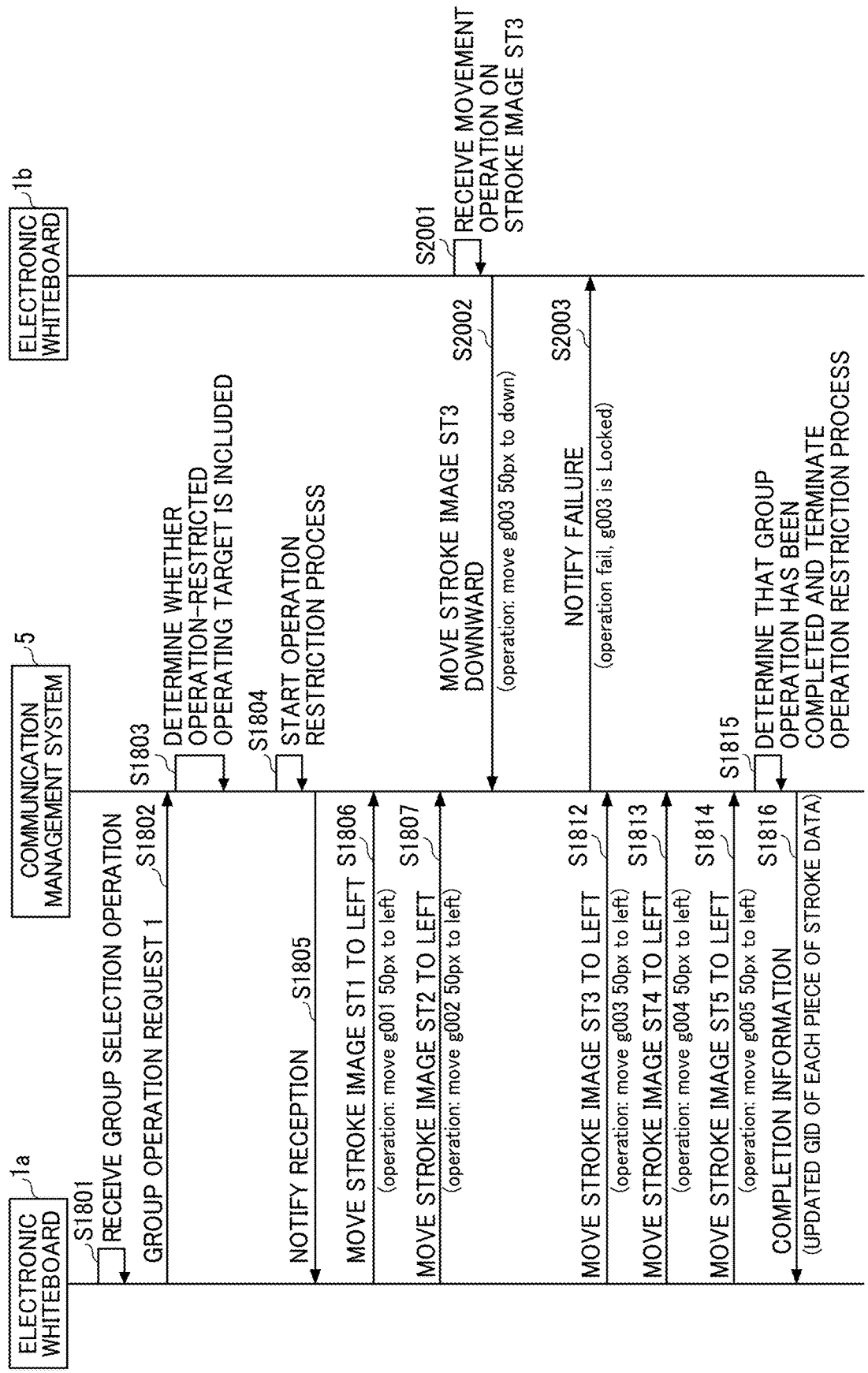
FIG. 20 is a second sequence diagram illustrating an example of an operation restriction process according to the first embodiment of the present disclosure.

FIG. 20 is a second sequence diagram illustrating an example of the operation restriction process according to the first embodiment of the present disclosure. This process is another example of the operation restriction process performed by the operation restriction unit 57 of the communication management system 5. As the process from steps S1801 to S1807 and from steps S1812 to S1816 in the process illustrated in FIG. 20 is the same as the process described in FIG. 18, a difference from the process illustrated in FIG. 18 is primarily described.

In step S2001, the acceptance unit 12 of the electronic whiteboard 1b accepts the operation performed by the user B to move the stroke image ST3 downward by a predetermined distance while the user A performs the group operation on the stroke images ST1 to ST5.

In step S2002, the information transmission unit 16 of the electronic whiteboard 1b transmits, to the communication management system 5, the operation information for moving the stroke image ST3 (Gid=g003) downward by a predetermined distance in accordance with the user B's operation to move the stroke image ST3. However, as the operation on the stroke image ST3 is restricted due to the operation restriction process by the operation restriction unit 57 of the communication management system 5, the stroke-information management unit 56 is not allowed to perform the operation to move the stroke image ST3 (Gid=g003).

In step S2003, the stroke-information management unit 56 of the communication management system 5 transmits, to the electronic whiteboard 1b, the failure notification indicating that the movement of the stroke image ST3 has failed.

As described above, the operation restriction unit 57 according to the present embodiment receives the group operation information from the electronic whiteboard 1 and then restricts the operation from the different electronic whiteboard 1 on the stroke image designated by the group operation information.

Thus, according to the present embodiment, an operation different from an operation intended by a user is prevented from being performed on a stroke image due to operations performed by a plurality of terminal apparatuses during the session in which the plurality of terminal apparatuses shares the stroke image.

Second Embodiment

Figure 21:
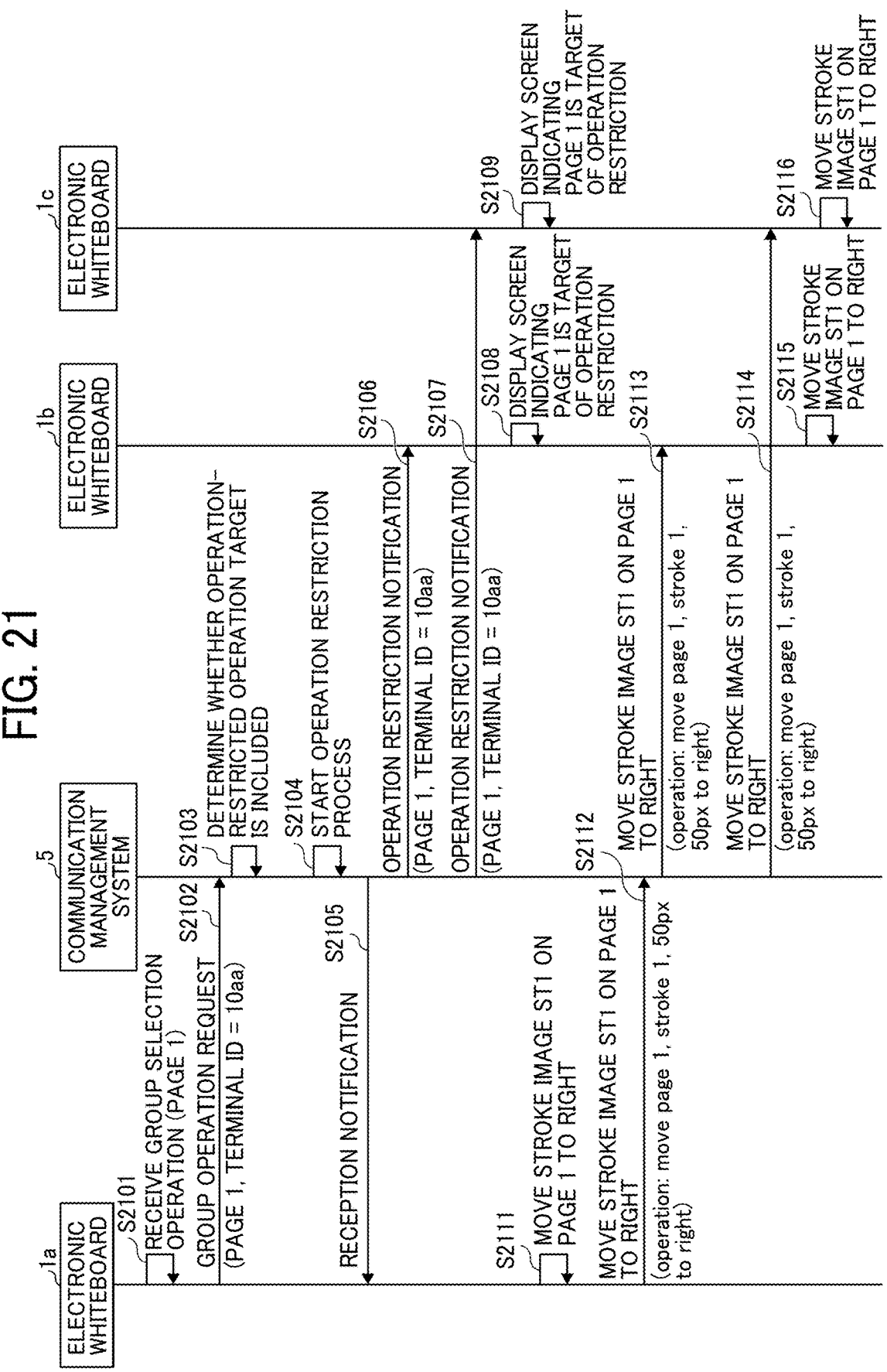
FIG. 21 is a sequence diagram illustrating an example of an operation restriction process according to the second embodiment of the present disclosure.

FIG. 21 is a sequence diagram illustrating an example of the operation restriction process according to the second embodiment. This processing is an example of the operation restriction processing by the communication management system 5 and the electronic whiteboard 1.

A description is given hereinafter of an example in which the communication system 100 includes three electronic whiteboard 1a, electronic whiteboard 1b, and electronic whiteboard 1c, and these three electronic whiteboard 1a, electronic whiteboard 1b, and electronic whiteboard 1c participate in a videoconference in which the same stroke image is shared In step S2101, the acceptance unit 12 of the electronic whiteboard 1a accepts a group selecting operation from the user A using the electronic whiteboard 1a. In this example, it is assumed that a "page 1" of the electronic whiteboard 1a is selected through the group selection operation. As this example, the operation of selecting a group for designating one or more pieces of stroke data as an operation target can be performed on a page-by-page basis.

In step S2102, in response to the operation of selecting the group by the user A, the information transmission unit 16 of the electronic whiteboard 1a transmits group operation request to the communication management system 5. This group operation request includes the "page 1", which is information of the selected operation target, and the terminal ID "10aa" of the electronic whiteboard 1a.

In step S2103, in response to receiving the group operation request transmitted from the electronic whiteboard 1a, the operation restriction unit 57 of the communication management system 5 determines whether the "page 1" designated by the group operation request includes an operation-restricted operation target (e.g., stroke data or a page).

When the operation target designated by the group operation request includes no operation-restricted operation target, the operation proceeds to step S2104. By contrast, when the operation target designated by the group operation request includes an operation-restricted operation target, the operation restriction unit 57 of the communication management system 5 stops execution of the processing of step S2104 and subsequent steps, and transmits a rejection notification to the electronic whiteboard 1a, which has transmitted the request. In this example, the following description is given on the assumption that the operation target designated by the group operation request includes no operation-restricted operation target.

In step S2104, the operation restriction unit 57 of the communication management system 5 starts operation restriction process for page 1 designated by the group operation request.

In step S2105, the operation restriction unit 57 of the communication management system 5 transmits a reception notification indicating that the group operation request has been received to the electronic whiteboard 1a, which has transmitted the request.

In steps S2106 and S2107, the operation restriction unit 57 of the communication management system 5 according to the second embodiment transmits an operation restriction notification indicating that the operation restriction process has started, to each of the electronic whiteboard 1b and the electronic whiteboard 1c participating in the videoconference. The operation restriction notification includes, for example, information (e.g., "page 1") on the operation target for which operation is to be restricted and information (e.g., the terminal ID "10aa") on the electronic whiteboard 1a, which has requested the operation restriction on the operation target. Alternatively, examples of the information on the electronic whiteboard 1a includes a terminal name of the electronic whiteboard 1a and a destination name managed in the terminal management table 800.

Figure 22:
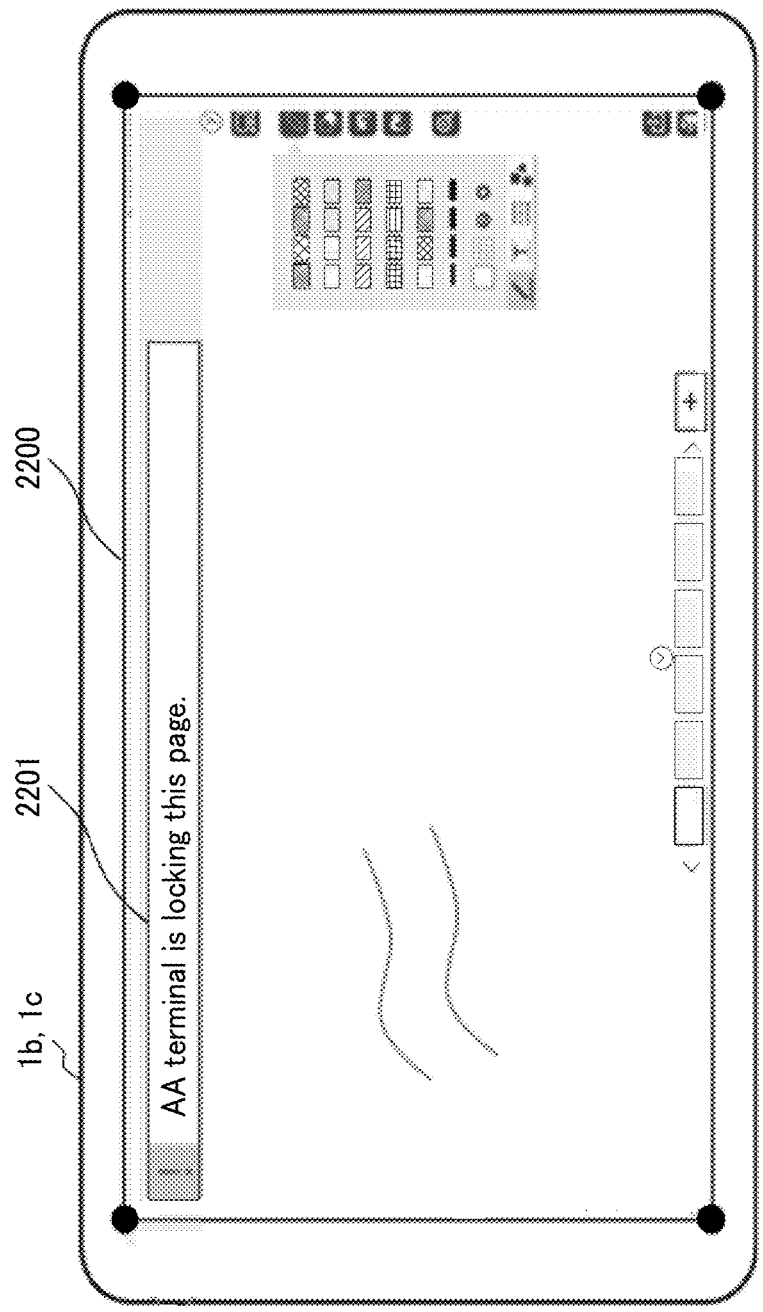
FIG. 22 is a diagram illustrating an example of a display screen according to the second embodiment of the present disclosure.

In steps S2108 and S2109, in response to receiving the operation restriction notification from the communication management system 5, the display controller 14 of each of the electronic whiteboard 1b and electronic whiteboard 1c displays a display screen 2200, for example, as illustrated in FIG. 22, indicating that operation on page 1 is being restricted.

FIG. 22 is a diagram illustrating and example of the display screen according to the second embodiment. FIG. 22 illustrates an example of the display screen 2200 displayed by the electronic whiteboard 1b and electronic whiteboard 1c in steps S2108 and S2109 in FIG. 21. In the example of FIG. 22, the page 1 is displayed on the display screen 2200 of the electronic whiteboard 1b and electronic whiteboard 1c. Further, a message 2201 indicating that the operation on the page 1 is restricted is displayed on display screen 2200. This message 2201 suppresses execution of operation on the page 1 by the electronic whiteboard 1b and electronic whiteboard 1c. The message 2201 preferably includes information (e.g., a terminal name, a destination name, and/or a terminal ID) on the electronic whiteboard 1a, which locks the page 1 (i.e., which requested the operation restriction on the page 1).

The message 2201 is an example of display information indicating that the operation is being restricted. Instead of such character string, other examples of the display information indicating that the operation is being restricted include pictograms and icons.

The operation described heretofore enables the user A of the electronic whiteboard 1a to preferentially operate the stroke image included in the operation target "page 1".

For example, in step S2111, when the user A moves the stroke image ST1 of the page 1 on the electronic whiteboard 1a to the right, the operation proceeds to step S2112.

In step S2112, the information transmission unit 16 of the electronic whiteboard 1a transmits, to the communication management system 5, operation information for moving the stroke image ST1 (stroke 1) of page 1 rightward by a predetermined distance.

In steps S2113 and S2114, the stroke-information management unit 56 of the communication management system 5 transmits operation information for moving the stroke image ST1 (stroke 1) rightward by the predetermined distance to the electronic whiteboard 1b and electronic whiteboard 1c.

Thereby, in steps S2115 and S2116, the stroke image ST1 of page 1 on each of the electronic whiteboard 1b and electronic whiteboard 1c is moved rightward, and the same stroke image is displayed on the page 1 of each the electronic whiteboard 1a, electronic whiteboard 1b and electronic whiteboard 1c.

As described heretofore, according to the communication system 100 according to the second embodiment, an operation different from an operation intended by a user is prevented from being performed on a stroke image due to operations performed by plural electronic whiteboards, e.g., the electronic whiteboard 1a, electronic whiteboard 1b, and electronic whiteboard 1c.

Third Embodiment

Figure 23:
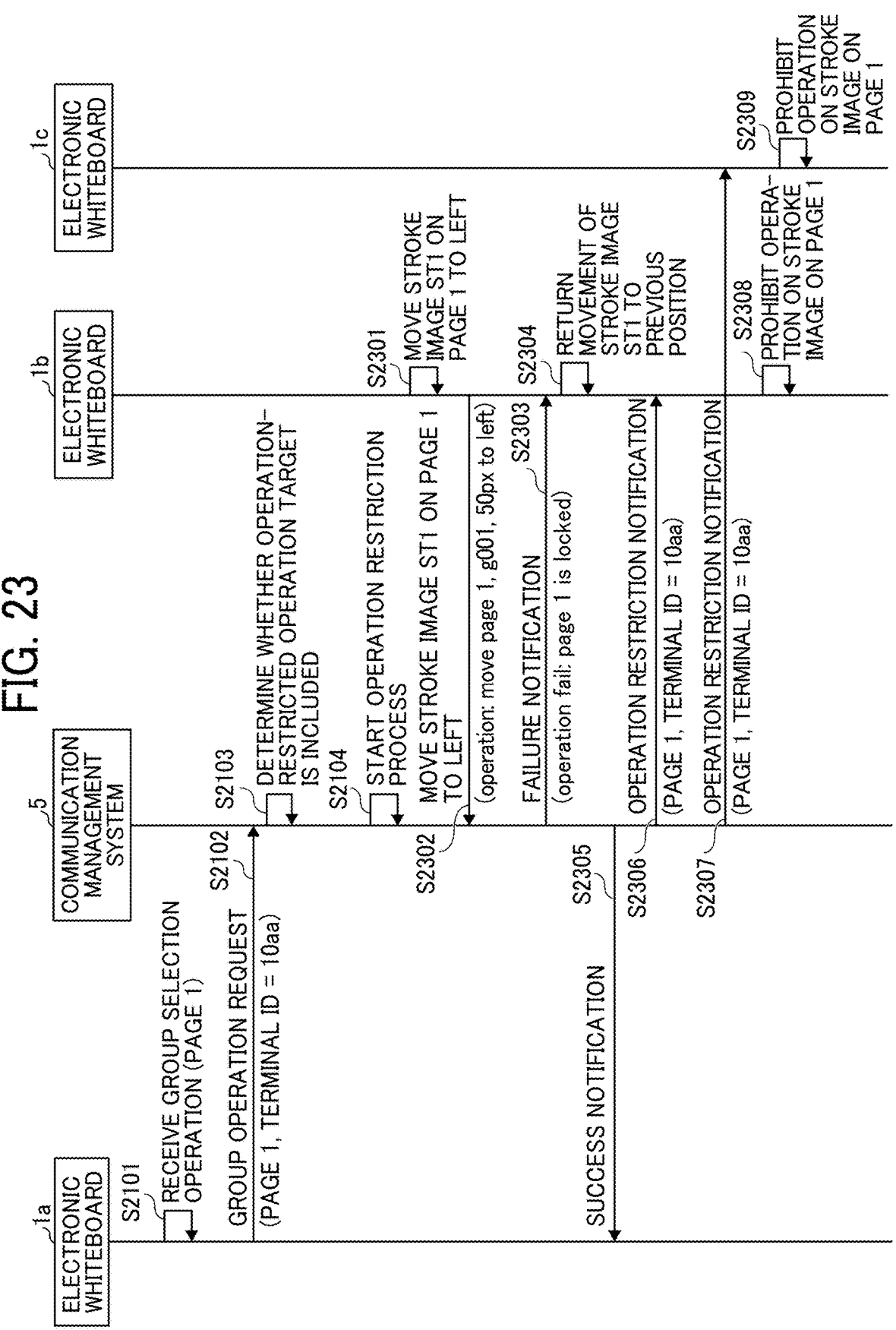
FIG. 23 is a sequence diagram illustrating an example of an operation restriction process according to the third embodiment of the present disclosure.

FIG. 23 is a sequence diagram illustrating an example of an operation restriction process according to the third embodiment. The operation from S2101 to S2104 in FIG. 23 are the same or substantially the same as those illustrated in the sequence diagram of FIG. 21 according to the second embodiment. Accordingly, a redundant description thereof is omitted below, and a description is given of differences between the second embodiment and the third embodiment.

Even after the operation restriction unit 57 of the communication management system 5 starts the operation restriction process in step S2104 of FIG. 23, the electronic whiteboard 1b and/or electronic whiteboard 1c may perform operation on the page 1 before the operation restriction unit 57 transmits the operation restriction notification to the electronic whiteboard 1b and electronic whiteboard 1c.

For example, it is assumed that the user B using the electronic whiteboard 1b moves the stroke image ST1 of the page 1 to the left in step S2301 in FIG. 23. In this case, the communication management system 5 and the electronic whiteboard 1 performs operation from step S2302 to S2304.

In step S2302, the information transmission unit 16 of the electronic whiteboard 1b transmits, to the communication management system 5, operation information for moving the stroke image ST1 (stroke 1) of the page 1 leftward by a predetermined distance.

However, since the operation on the page 1 has already been restricted by the operation restriction process by the operation restriction unit 57 of the communication management system 5, the stroke-information management unit 56 cannot perform the movement process of the stroke image ST1 of the page 1. In such case, in step S2303, the stroke-information management unit 56 of the communication management system 5 transmits a failure notification indicating that the movement of the stroke image ST1 of the page 1 has failed to the electronic whiteboard 1b.

In step S2304, in response to receiving the failure notification from the communication management system 5, the image processing unit 15 of the electronic whiteboard 1b returns the stroke image ST1 of the page 1 of which movement has failed to the previous position. Thereby, the stroke images of the page 1 displayed on the electronic whiteboard 1a, electronic whiteboard 1b, and electronic whiteboard 1c are maintained in the same state.

In addition, in the second embodiment, when the electronic whiteboard 1b receives a moving operation on the stroke image ST1 of the page 1 while the display screen 2200 as illustrated in FIG. 22 is displayed, the operation from step S2302 to S2304 of FIG. 23 can be applied.

Next, a description is given of an operation performed after step S2305, in which the operation restriction unit 57 of the communication management system 5 transmits a reception notification indicating that the group operation request has been received to the electronic whiteboard 1a, which has transmitted the request.

In steps S2306 and S2307, the operation restriction unit 57 of the communication management system 5 transmits an operation restriction notification indicating that the operation restriction process has started, to each of the electronic whiteboard 1b and the electronic whiteboard 1c participating in the videoconference.

In steps S2308 and S2309, in response to receiving the operation restriction notification from the communication management system 5, the electronic whiteboard 1b and electronic whiteboard 1c prohibit the operation on the stroke image of the page 1, which is an operation restriction target.

Figure 24:
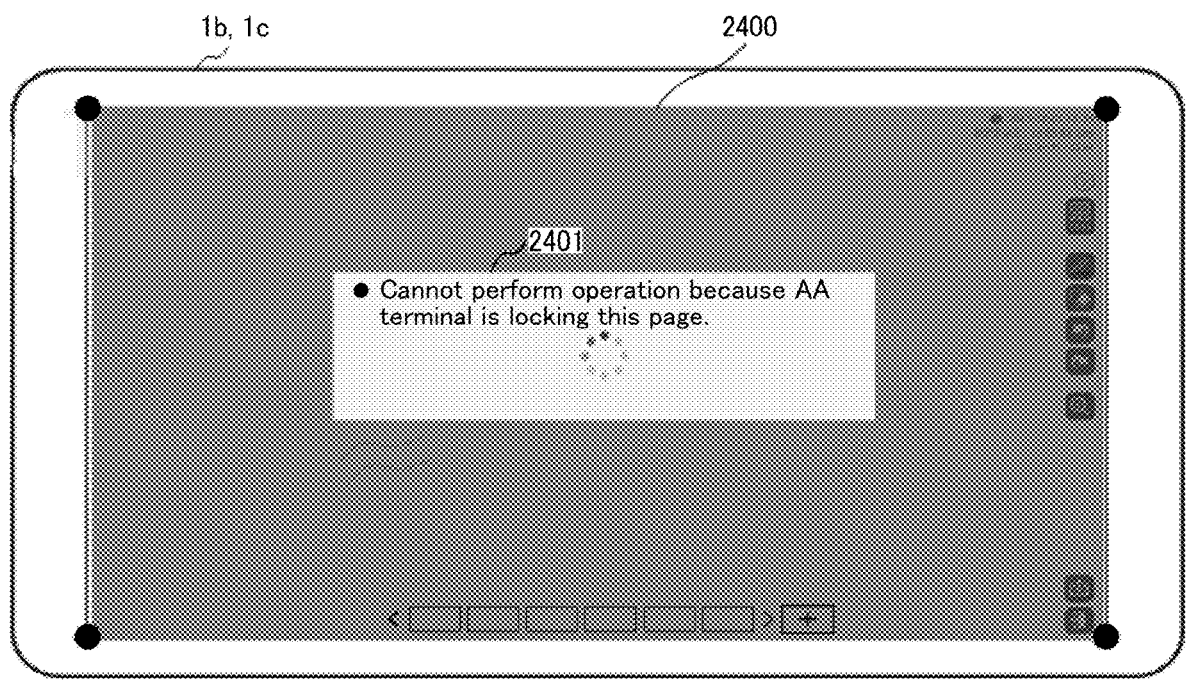
FIG. 24 is a diagram illustrating an example of a display screen according to the third embodiment of the present disclosure.

For example, the display controller 14 of each of the electronic whiteboard 1b and electronic whiteboard 1c displays a display screen 2400 as illustrated in FIG. 24. Further, the acceptance unit 12 of each of the electronic whiteboard 1b and electronic whiteboard 1c receives prohibits an editing operation on the stroke image of the page 1.

FIG. 24 is a diagram illustrating and example of the display screen 2400 according to the third embodiment. FIG. 24 illustrates an example of the display screen 2400 displayed by the electronic whiteboard 1b and electronic whiteboard 1c in steps S2308 and S2309 in FIG. 23.

In the example of FIG. 24, the page 1 is displayed on the display screen 2400 of the electronic whiteboard 1b and electronic whiteboard 1c. However, the page 1 is grayed out, for example, so that the operation on the page 1 cannot be performed. Also, on the display screen 2400, a message 2401 is displayed indicating that the operation on the page 1 is restricted and operation on the page 1 cannot be performed. The message 2401 preferably includes information (e.g., a terminal name, a destination name, and/or a terminal ID) on the electronic whiteboard 1a, which locks the page 1 (i.e., which requested the operation restriction on the page 1).

The operation described heretofore prohibits an editing operation on the stroke image of the page 1 from the electronic whiteboard 1b and the electronic whiteboard 1c, thereby the user A of the electronic whiteboard 1a can preferentially operate the stroke image included in the page 1.

Although in the second and third embodiments, the description given above is of an example in which an operation is restricted on the stroke image of the page 1, alternatively, stroke data as a target of operation restriction may be one or more selected stroke images, in substantially the same manner as the first embodiment. The stroke data as a target of the operation restriction may be stroke images of a plurality of pages.

According to one or more embodiments of the present invention, an operation different from an operation intended by a user is prevented from being performed on a stroke image due to operations performed by a plurality of terminal apparatuses during a session in which the plurality of terminal apparatuses shares the stroke image.

In a conference in which plural terminal apparatuses share a stroke image, there is a drawback that, when the plural terminal apparatuses perform operations on the shared stroke image, an operation different from the operation intended by a user is performed on the stroke image in some operating timing.

Such drawback is common to various communication systems that provide a session in which a stroke image is shared, e.g., a remote lesson or a remote medical care as well as the conference system for holding a conference.

According to one or more embodiments of the present disclosure, an operation different from an operation intended by a user is prevented from being performed on a stroke image due to operations performed by a plurality of terminal apparatuses during a session in which the plurality of terminal apparatuses shares a stroke image.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Figure 25:
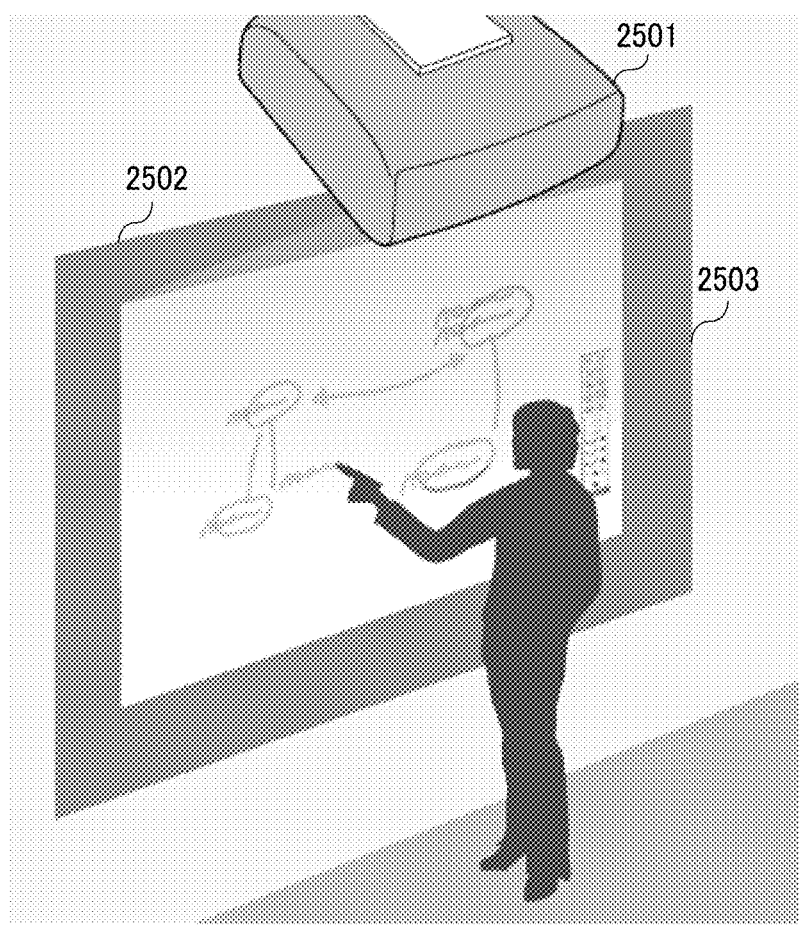
FIG. 25 is a diagram illustrating another example of a usage situation, according to an embodiment of the present disclosure.

In the description according to the above embodiments, the terminal apparatus is the electronic whiteboard 1; however, the embodiments are not limited thereto. For example, each embodiment of the present invention is also applicable to an interactive projector 2501 as illustrated in FIG. 25. The interactive projector 2501 is, for example, a terminal apparatus that can project a display screen on a projection surface 2502 and allows a user to draw stroke images, select menus or the like with a pen, or a user's finger, for example, like the electronic whiteboard 1.

Other examples of the terminal apparatus may include an information apparatus such as a PC, a smartphone, a smart watch, or a car navigation device, which executes the application corresponding to the communication system 100. The terminal apparatus includes a medical device. In the case of a medical device, the document image may include images of a patient, etc.

In the description according to each of the embodiments described above, a video conference is held by the communication system 100; however, the embodiments are not limited thereto. The communication system 100 may be used for a meeting, a general conversion in a family or between friends, etc., a remote medical care, or presentation of information in one direction.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. A communication management system that manages a videoconference session between a plurality of terminal apparatuses that share a stroke image, the communication management system comprising:
   circuitry configured to:
   receive, from a first terminal apparatus of the plurality of terminal apparatuses, group operation information for designating one or more pieces of stroke data, which are operation targets, from among a plurality of pieces of stroke data representing the stroke image drawn on a single device in the videoconference session;
   determine a result indicating whether the received group operation information includes stroke data on which a second terminal apparatus of the plurality of terminal apparatuses is prohibited from performing an operation to the one or more pieces of stroke data while the first terminal apparatus performs an edit operation on the operation targets; and
   prohibit, based on the result indicating to prohibit, the second terminal apparatus from performing the operation to the one or more pieces of stroke data while the first terminal apparatus performs the edit operation on the operation targets.

2. The communication management system according to claim 1, wherein in a case that the one or more pieces of stroke data designated by the group operation information include no stroke data for which operation is being prohibited, the circuitry further configured to prohibit the operation regarding the one or more pieces of stroke data by the second terminal apparatus.

3. The communication management system according to claim 1, wherein in a case that the one or more pieces of stroke data designated by the group operation information include stroke data on which operation is being prohibited, the circuitry is further configured to cancel a process of prohibiting the operation regarding the one or more pieces of stroke data by the second terminal apparatus.

4. The communication management system according to claim 1, wherein in a case that the first terminal apparatus performs the edit operation regarding each of the one or more pieces of stroke data, after the circuitry prohibits the operation regarding the one or more pieces of stroke data by the second terminal apparatus, the circuitry is further configured to cancel prohibiting the operation regarding the one or more pieces of stroke data.

5. The communication management system according to claim 1, wherein
   the circuitry is further configured to manage the plurality of pieces of stroke data in association with first identification information for identifying the videoconference session, and
   each of the plurality of pieces of stroke data includes second identification information for identifying each piece of stroke data, drawing data for reproducing the stroke image, and third identification information for identifying the drawing data.

6. The communication management system according to claim 5, wherein the group operation information includes the first identification information and the second identification information for identifying the one or more pieces of stroke data.

7. A communication system, comprising:
   the communication management system according to claim 1; and
   the plurality of terminal apparatuses, wherein
   each terminal apparatus of the plurality of terminal apparatuses includes second circuitry configured to:
   participate in the videoconference session managed by the communication management system;
   accept a designation operation for designating one or more pieces of stroke data, which are operation targets, and an editing operation regarding the one or more pieces of stroke data; and
   transmit, to the communication management system, group operation information for designating one or more pieces of stroke data, which are to be targets of the editing operation, in accordance with the designation operation.

8. The communication system according to claim 7, wherein the second circuitry of each terminal apparatus of the plurality of terminal apparatuses is further configured to control display, on a display screen, of display information indicating that an operation regarding one or more pieces of stroke data is being prohibited, in response to a rejection notification that prohibits the operation on the one or more pieces of stroke data.

9. The communication system according to claim 7, wherein the second circuitry of each terminal apparatus of the plurality of terminal apparatuses is further configured to prohibit reception of the editing operation on one or more pieces of stroke data in response to a rejection notification that prohibits an operation regarding the one or more pieces of stroke data, the rejection notification being transmitted from the communication management system.

10. The communication system according to claim 7, wherein based on the group operation information, received from a first terminal apparatus, for designating one or more pieces of stroke data, the communication management system transmits a rejection notification indicating that an operation regarding the one or more pieces of stroke data is being prohibited, to each of second terminal apparatuses, each being different from the first terminal apparatus.

11. A terminal apparatus, comprising:
  circuitry configured to:
    share a stroke image during a videoconference session with another terminal apparatus, the stroke image having been drawn on the terminal apparatus in the videoconference session;
    accept a designation operation for designating one or more pieces of stroke data, which are operation targets, from among a plurality of pieces of stroke data representing the stroke image;
    determine a result indicating whether to prohibit the another terminal apparatus from performing an operation to the one or more pieces of stroke data while the circuitry performs an edit operation on the operation targets; and
    prohibit, based on the result indicating to prohibit, the another terminal apparatus from performing the operation to the one or more pieces of stroke data while the circuitry performs the edit operation on the operation targets.

12. An image processing method performed by a terminal apparatus, the image processing method comprising:
  sharing a stroke image during a videoconference session with another terminal apparatus, the stroke image having been drawn on the terminal apparatus in the videoconference session;
  accepting a designation operation for designating one or more pieces of stroke data, which are operation targets, from among a plurality of pieces of stroke data representing the stroke image;
  determining a result indicating whether to prohibit the another terminal apparatus from performing an operation to the one or more pieces of stroke data while the circuitry performs an edit operation on the operation targets; and
  prohibiting, based on the result indicating to prohibit, the another terminal apparatus from performing the operation to the one or more pieces of stroke data while the circuitry performs the edit operation on the operation targets.

13. A non-transitory computer-readable medium storing a program that causes the terminal apparatus to carry out the image processing method of claim 12.

14. The communication management system according to claim 1, wherein the group operation information indicates a selection of a character string represented by the stroke image drawn on the single device.

15. The communication management system according to claim 1, wherein the group operation information indicates a user input command for to edit the stroke image.

16. The communication management system according to claim 1, wherein the group operation information indicates a user input command for operating the single device.

17. The communication management system according to claim 1, wherein to prohibit the second terminal apparatus from performing the operation, the circuitry is configured to transmit a rejection notification to the second terminal apparatus.

18. The terminal apparatus according to claim 11, wherein to prohibit the another terminal apparatus from performing the operation, the circuitry is configured to transmit a rejection notification to the another terminal apparatus.

19. The image processing method according to claim 12, wherein the prohibiting includes transmitting a rejection notification to the second terminal apparatus.

* * * * *